United States Patent
Li et al.

(10) Patent No.: US 10,706,454 B2
(45) Date of Patent: Jul. 7, 2020

(54) METHOD, MEDIUM, AND SYSTEM FOR TRAINING AND UTILIZING ITEM-LEVEL IMPORTANCE SAMPLING MODELS

(71) Applicant: Adobe Inc., San Jose, CA (US)

(72) Inventors: Shuai Li, Sha Tin (HK); Zheng Wen, Fremont, CA (US); Yasin Abbasi Yadkori, San Francisco, CA (US); Vishwa Vinay, Karnataka (IN); Branislav Kveton, San Jose, CA (US)

(73) Assignee: ADOBE INC., San Jose, CA (US)

( * ) Notice: Subject to any disclaimer, the term of this patent is extended or adjusted under 35 U.S.C. 154(b) by 308 days.

(21) Appl. No.: 15/943,807

(22) Filed: Apr. 3, 2018

(65) Prior Publication Data

US 2019/0303995 A1    Oct. 3, 2019

(51) Int. Cl.
| | |
|---|---|
| G06Q 30/00 | (2012.01) |
| G06Q 30/06 | (2012.01) |
| G06Q 30/02 | (2012.01) |
| G06N 20/00 | (2019.01) |

(52) U.S. Cl.
CPC ......... *G06Q 30/0631* (2013.01); *G06N 20/00* (2019.01); *G06Q 30/0253* (2013.01); *G06Q 30/0633* (2013.01)

(58) Field of Classification Search
CPC ........... G06Q 30/0631; G06Q 30/0253; G06Q 30/0633; G06N 20/00
See application file for complete search history.

(56) References Cited

U.S. PATENT DOCUMENTS

2008/0243815 A1* 10/2008 Chan .................. G06Q 30/02

OTHER PUBLICATIONS

Georges E. Dupret and Benjamin Piwowarski. 2008. A User Browsing Model toPredict Search Engine Click Data from Past Observations.. In Proceedings of the 31st Annual International ACM SIGIR Conference on Research and Development in Information Retrieval. (Year: 2008).*

Christophe Andrieu, Nando de Freitas, Arnaud Doucet, and Michael Jordan. 2003. An Introduction to MCMC for Machine Learning. Machine Learning 50 (2003), 5-43.

(Continued)

*Primary Examiner* — Matthew E Zimmerman
(74) *Attorney, Agent, or Firm* — Keller Jolley Preece

(57) ABSTRACT

The present disclosure is directed toward systems, methods, and computer readable media for training and utilizing an item-level importance sampling model to evaluate and execute digital content selection policies. For example, systems described herein include training and utilizing an item-level importance sampling model that accurately and efficiently predicts a performance value that indicates a probability that a target user will interact with ranked lists of digital content items provided in accordance with a target digital content selection policy. Specifically, systems described herein can perform an offline evaluation of a target policy in light of historical user interactions corresponding to a training digital content selection policy to determine item-level importance weights that account for differences in digital content item distributions between the training policy and the target policy. In addition, the systems described herein can apply the item-level importance weights to training data to train item-level importance sampling model.

20 Claims, 10 Drawing Sheets

(56) References Cited

OTHER PUBLICATIONS

Léon Bottou, Jonas Peters, Joaquin Quiñonero-Candela, Denis X Charles, D Max Chickering, Elon Portugaly, Dipankar Ray, Patrice Simard, and Ed Snelson. 2013. Counterfactual reasoning and learning systems: The example of computational advertising. The Journal of Machine Learning Research 14, 1 (2013), 3207-3260.

Olivier Chapelle and Ya Zhang. 2009. A Dynamic Bayesian Network Click Model for Web Search Ranking. In Proceedings of the 18th International Conference on World Wide Web.

Wei Chen, Yajun Wang, and Yang Yuan. 2013. Combinatorial Multi-Armed Bandit: General Framework, Results and Applications. In Proceedings of the 30th International Conference on Machine Learning. 151-159.

Aleksandr Chuklin, Ilya Markov, and Maarten de Rijke. 2015. Click Models for Web Search. Morgan & Claypool. https://doi.org/10.2200/S00654ED1V01Y201507ICR043.

Nick Craswell, Onno Zoeter, Michael Taylor, and Bill Ramsey. 2008. An Experimental Comparison of Click Position-bias Models. In Proceedings of the 2008 International Conference on Web Search and Data Mining.

Miroslav Dudik, John Langford, and Lihong Li. 2011. Doubly Robust Policy Evaluation and Learning. In Proceedings of the 28th International Conference on Machine Learning (ICML-11). 1097-1104.

Georges Dupret, Vanessa Murdock, and Benjamin Piwowarski. 2007. Web search engine evaluation using clickthrough data and a user model. In WWW2007 workshop Query Log Analysis: Social and Technological Challenges.

Georges E. Dupret and Benjamin Piwowarski. 2008. A User Browsing Model toPredict Search Engine Click Data from Past Observations. In Proceedings of the 31st Annual International ACM SIGIR Conference on Research and Development in Information Retrieval.

Yi Gai, Bhaskar Krishnamachari, and Rahul Jain. 2012. Combinatorial Network Optimization with Unknown Variables: Multi-Armed Bandits with Linear Rewards and Individual Observations. IEEE/ACM Transactions on Networking 20, 5 (2012), 1466-1478.

Alexandre Gilotte, Clement Calauzenes, Thomas Nedelec, Alexandre Abraham, and Simon Dollé. 2018. Offline A/B testing for Recommender Systems. arXiv preprint arXiv:1801.07030 (2018).

Fan Guo, Chao Liu, and Yi Min Wang. 2009. Efficient Multiple-click Models in Web Search. In Proceedings of the Second ACM International Conference on Web Search and Data Mining.

Katja Hofmann, Lihong Li, and Filip Radlinski. 2016. Online Evaluation for Information Retrieval. Foundations and Trends in Information Retrieval 10, 1 (2016).

Katja Hofmann, Shimon Whiteson, and Maarten de Rijke. 2012. Estimating Interleaved Comparison Outcomes from Historical Click Data. In Proceedings of the 21st ACM International Conference on Information and Knowledge Management.

Thorsten Joachims, Laura Granka, Bing Pan, Helene Hembrooke, and Geri Gay. 2005. Accurately Interpreting Clickthrough Data as Implicit Feedback. In Proceedings of the 28th Annual International ACM SIGIR Conference on Research and Development in Information Retrieval.

Thorsten Joachims, Adith Swaminathan, and Tobias Schnabel. 2017. Unbiased learning-to-rank with biased feedback. In Proceedings of the Tenth ACM International Conference on Web Search and Data Mining. ACM, 781-789.

Branislav Kveton, Zheng Wen, Azin Ashkan, and Csaba Szepesvari. 2015. Tight Regret Bounds for Stochastic Combinatorial Semi-Bandits. In Proceedings of the 18th International Conference on Artificial Intelligence and Statistics.

John Langford, Alexander Strehl, and Jennifer Wortman. 2008. Exploration scavenging. In Proceedings of the 25th international conference on Machine learning. ACM, 528-535.

Lihong Li, Wei Chu, John Langford, and Xuanhui Wang. 2011. Unbiased offline evaluation of contextual-bandit-based news article recommendation algorithms. In Proceedings of the fourth ACM international conference on Web search and data mining. ACM, 297-306.

Olivier Nicol, Jérémie Mary, and Philippe Preux. 2014. Improving offline evaluation of contextual bandit algorithms via bootstrapping techniques. In Proceedings of the 31th International Conference on Machine Learning (ICML-2014), Beijing, China, vol. 32. 172-180.

Filip Radlinski, Madhu Kurup, and Thorsten Joachims. 2008. How does clickthrough data reflect retrieval quality?. In Proceedings of the 17th ACM conference on Information and knowledge management. ACM, 43-52.

Matthew Richardson, Ewa Dominowska, and Robert Ragno. 2007. Predicting Clicks: Estimating the Click-through Rate for New Ads. In Proceedings of the 16th International Conference on World Wide Web.

Dan Siroker and Pete Koomen. 2013. A/B testing: The most powerful way to turn clicks into customers. John Wiley & Sons.

Alex Strehl, John Langford, Lihong Li, and Sham M Kakade. 2010. Learning from logged implicit exploration data. In Advances in Neural Information Processing Systems. 2217-2225.

Adith Swaminathan, Akshay Krishnamurthy, Alekh Agarwal, Miroslav Duda, John Langford, Damien Jose, and Imed Zitouni. 2016. Off-policy evaluation for slate recommendation. arXiv preprint arXiv:1605.04812 (2016).

Xuanhui Wang, Nadav Golbandi, Michael Bendersky, Donald Metzler, and Marc Najork. 2018. Position Bias Estimation for Unbiased Learning to Rank in Personal Search. (2018).

Yandex 2013. Yandex Personalized Web Search Challenge. https://www.kaggle.com/c/yandex-personalized-web-search-challenge. (2013).

* cited by examiner

METHOD, MEDIUM, AND SYSTEM FOR TRAINING AND UTILIZING ITEM-LEVEL IMPORTANCE SAMPLING MODELS

BACKGROUND

Recent years have seen significant improvement in digital systems that provide dynamic web content to client devices across computer networks. Indeed, it is now common for websites or other digital assets hosted at remote servers to include personalized and adaptive content tailored to individual users of client devices. For example, conventional digital content testing and distribution systems can provide uniquely tailored lists of images, videos, documents, or other digital content to individual client devices by applying digital content selection policies.

In an effort to implement effective digital content selection policies, conventional digital content testing and distribution systems often perform testing between content selection policies to identify whether a particular content selection policy is effective or not. While conventional digital content testing and distribution systems can evaluate and deliver lists of digital content, these systems still include a variety of problems and drawbacks.

For example, conventional systems are often inaccurate. To illustrate, conventional digital content testing and distribution systems often evaluate effectiveness of content selection policies by conducting an online comparison test (e.g., an online bucket test such as A/B testing) and tracking key metrics such as clicks, downloads, and purchases to determine which of two different policies perform better. While online comparison tests provide a tool for comparing two digital content selection policies, the digital content policies utilized in such tests are often inaccurate and provide erroneous digital content to individual client devices while testing (e.g., because online comparison tests often analyze less effective digital content selection policies that yield unknown results). Accordingly, these systems often result in a poor viewer experience, particularly for those viewers who receive erroneous digital content in accordance with a less effective policy. Indeed, many viewers who receive digital content in accordance with less effective content selection policies will navigate to other websites.

In addition, conducting online comparison tests is often expensive, inefficient, and inflexible. For example, conducting an online comparison test often involves distributing (and tracking distribution) of thousands of digital content lists across any number of client devices in addition to tracking and analyzing interactions with the distributed content to determine an effectiveness of a given content selection policy. These tests, thus, require significant computing resources in applying digital content policies in response to detecting opportunities corresponding to various client devices and distributing digital content to those client devices. In addition, because viewer behavior and individual online activity change over time, content distributors cannot replicate online comparison tests to confirm testing results. Accordingly, conventional systems generally utilize rigid testing approaches that apply only to specific digital content policies.

As an alternative to online comparison testing, some conventional systems perform policy evaluation by predicting user interactions with respective lists of digital content across a distribution of lists associated with corresponding content selection policies. As lists increase in length and content variety, however, the number of possible digital content lists that a content distributor can provide to target users grows exponentially. As a result, conventional policy evaluation techniques become computationally prohibitive as the number of combinations of different digital content items in digital content lists increases (and the amount of data necessary to accurately evaluate item lists for target policies increases).

These and other problems exist with regard to evaluating distribution policies for providing lists of digital content items.

SUMMARY

Embodiments of the present disclosure provide benefits and/or solve one or more of the foregoing and other problems in the art with systems, methods, and non-transitory computer readable media for training item-level importance sampling models to perform offline evaluation (and subsequent execution) of digital content selection policies. In particular, in one or more embodiments, the disclosed systems perform offline evaluation of ranked digital content lists by training clipped importance sampling models to evaluate content selection policies. To illustrate, the disclosed systems can determine item-level importance weight(s) based on a training digital content selection policy and a target digital content selection policy. The disclosed systems can further apply the item-level importance weight(s) to sampled digital interactions from a training set to train an item-level importance sampling model to predict performance values of the target digital content policy. In this manner, the disclosed systems can increase accuracy (e.g., reduce bias and provision of erroneous digital content), improve flexibility (e.g., generate different models that can evaluate a variety of different policies with less training data), and increase efficiency (e.g., reduce computing resources and the need for online testing) relative to conventional systems.

Additional features and advantages will be set forth in the description which follows, and in part will be obvious from the description, or may be learned by the practice of such exemplary embodiments.

BRIEF DESCRIPTION OF THE DRAWINGS

Various embodiments will be described and explained with additional specificity and detail through the use of the accompanying drawings in which.

DETAILED DESCRIPTION

Figure 1:
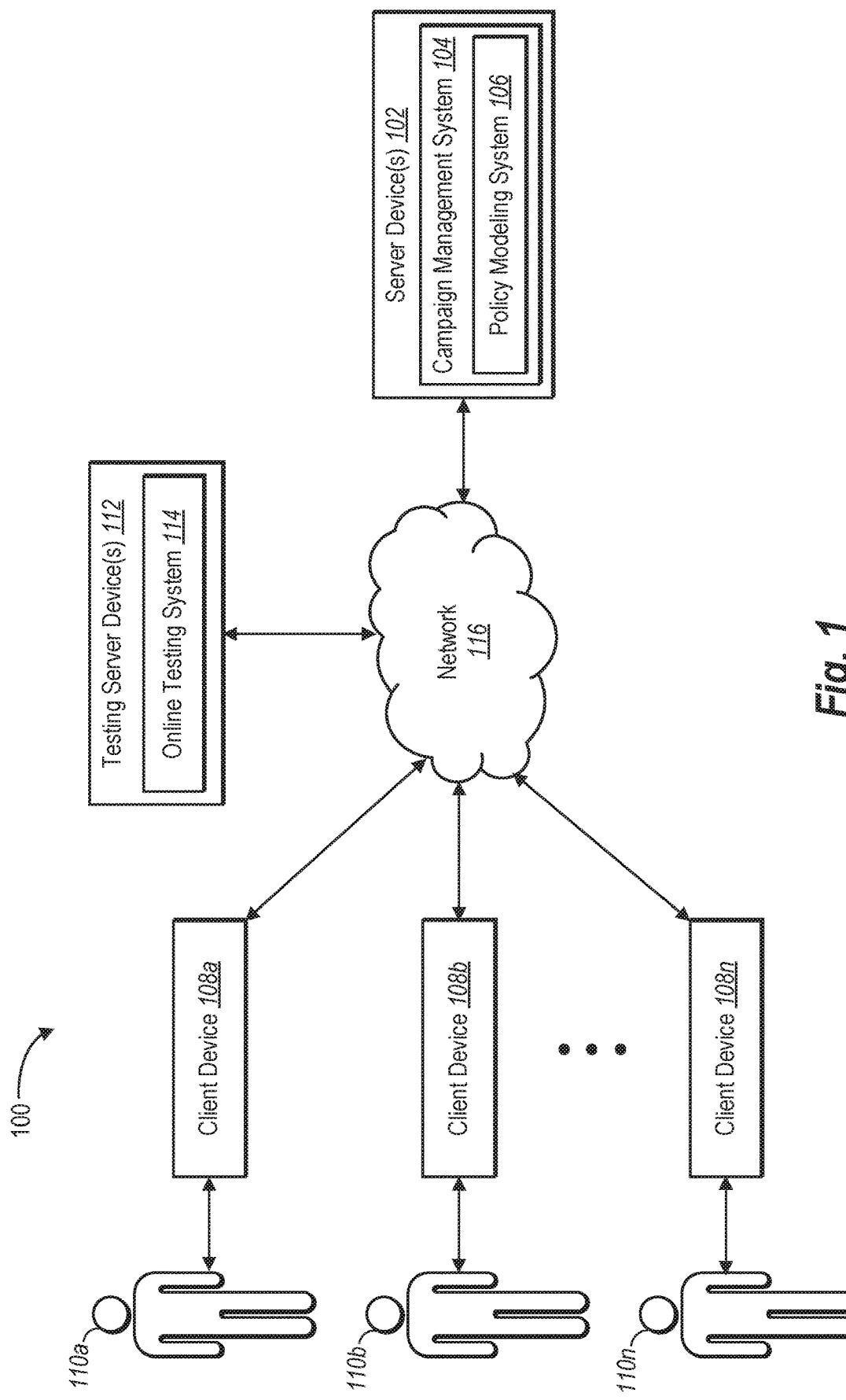
FIG. 1 illustrates a block diagram of an environment in which a policy modeling system is implemented in accordance with one or more embodiments.

One or more embodiments of the present disclosure include a policy modeling system that trains an item-level importance sampling model to generate predicted performance values of digital content selection policies. In addition, one or more embodiments of the policy modeling system execute digital content selection policies based on the predicted performance values of the digital content selection policies. In particular, the policy modeling system can utilize an item-level importance sampling model that accurately and efficiently predicts a performance value that indicates a probability that a target user will interact with ranked lists of digital content items provided in accordance with a target digital content selection policy (or simply "target policy"). Specifically, the policy modeling system can perform an offline evaluation of the target policy in light of historical user interactions corresponding to a training digital content selection policy (or simply "training policy") to train the item-level importance sampling model. For example, the policy modeling system can determine item-level importance weights that account for differences in digital content item distributions between the training policy and the target policy. The policy modeling system can then apply the item-level importance weights to training data to train the item-level importance sampling model.

By utilizing an item-level importance sampling model in accordance with one or more embodiments described herein, the policy modeling system can perform an offline evaluation of target policies without conducting expensive tests that often result in a poor user experience. Accordingly, the policy modeling system can substantially decrease negative interactions with potential consumers of digital content provided in accordance with one or more target policies. In addition, by training the sampling model at an item-level, the policy modeling system can accurately predict a performance value for a target policy without considering every possible permutation of item lists generated in accordance with a training policy and target policy. Therefore, the policy modeling system accurately determines a value of one or more target policies while significantly reducing consumption of computational resources.

To illustrate, in one or more embodiments, the policy modeling system identifies training data including digital interactions by training users with respect to digital content items presented as part of training item lists selected in accordance with a training policy. For one or more digital content items selected and presented from the training data, the policy modeling system determines training item-level selection probabilities based on the training policy and the target policy. Based on the item-level selection probabilities for the corresponding training policy and target policy, the policy modeling system determines item-level importance weights for the digital content item(s). In addition, the policy modeling system trains the item-level importance sampling model to predict a performance value that indicates a probability of interaction with digital content items presented in accordance with the target policy by applying the item-level importance weights to the digital interactions by the training users. Moreover, in one or more embodiments, the policy modeling system executes the target policy based on performance values determined using the trained item-level importance sampling model.

As just mentioned, the policy modeling system can receive or otherwise identify training data. In particular, the policy modeling system can identify a dataset of interactions by training users with respect to item lists presented in accordance with a training policy. For example, the policy modeling system can receive a logged dataset including a history of interactions (e.g., clicks, downloads, conversions) by any number of training users with respect to lists of digital content items presented to the training users via computing devices associated with the respective training users. In one or more embodiments, the policy modeling system receives a training policy including a distribution of item lists presented to the training users. Alternatively, in one or more embodiments, the policy modeling system estimates the training policy based on the logged dataset of interactions.

The policy modeling system can utilize the training data to train an item-level importance sampling model to predict performance of a target policy. In particular, the policy modeling system can train an item-level importance sampling model based on the logged dataset of interactions with respect to item lists presented in accordance with the training policy and further based on different item list distributions of the training policy and the target policy. Based on the training data and item list distributions, the policy modeling system can train an item-level importance sampling model to generate a performance value (e.g., predicted number of clicks or interactions).

In one or more embodiments, the policy modeling system trains the item-level importance sampling model by determining item-level selection probabilities for digital content items (e.g., individual digital content items in item lists). For example, the policy modeling system can determine a probability that digital content items will appear within a distribution of item lists generated in accordance with the training policy. Specifically, the policy modeling system determines item-level selection probabilities for individual digital content items for the training policy based on a frequency that the digital content items appears within a distribution of item lists associated with the training policy. The policy modeling system can similarly determine item-level selection probabilities for digital content items associated with the target policy.

Based on the item-level selection probabilities, the policy modeling system can also determine item-level importance weights for digital content items in the training data. For example, the policy modeling system can determine item-level importance weights on an item-by-item basis by comparing training item-level selection probabilities for the training policy and target item-level selection probabilities for the target policy. Furthermore, the policy modeling system can determine the item-level importance weights specific to particular digital content items and/or placement of digital content item within item lists.

In one or more embodiments, the policy modeling system trains the item-level importance sampling model by applying the determined item-level importance weights to sampled interactions in the training data. For example, the policy modeling system can apply item-level importance weights to each of the tracked interactions to predict how target users will interact with item lists presented in accordance with the target policy. In particular, the policy modeling system can apply an item-level importance weight to each of the tracked interactions to determine adjusted interaction scores associated with respective interactions from the training data. The policy modeling system can combine the adjusted user interaction scores to determine an estimated performance value for the target policy (e.g., predict a probability that a target user will interact with an item list presented in accordance with the target policy).

Moreover, in one or more embodiments described herein, the policy modeling system can also control potential variance in predicted values of the item-level importance sampling model. Specifically, in one or more embodiments, the policy modeling system applies a clipping threshold (or clipping constant). For example, in determining and applying item-level importance weights, the policy modeling system can apply an item-level clipping threshold. To illustrate, if the item-level importance weight exceeds the clipping threshold, the policy modeling system can replace the item-level importance weight with the clipping threshold. In this manner, the policy modeling system can reduce variance caused by low-volume samples from a training policy being extrapolated to high-volume distributions of a target policy.

As will be discussed in further detail below, the policy modeling system can determine performance values and item-level importance weights associated with digital content items in accordance with a number of behavioral models. For example, in one or more embodiments, the policy modeling system trains a content-based sampling model that generates a performance value based on content of the digital content item and independent of position of the digital content item within an item list. As another example, in one or more embodiments, the policy modeling system trains an item-position importance sampling model that generates a performance value based on both a position of the digital content item and content of the digital content item. As will be described in further detail below, the policy modeling system can train other item-level importance sampling models based on different behavioral modeling approaches.

In addition to training item-level importance sampling models, the policy modeling system can further execute one or more target policies based on performance values generated by the item-level importance sampling model. For example, in one or more embodiments, the policy modeling system can utilize item-level importance sampling models to predict a first performance value (e.g., indicating a first probability of user interaction corresponding to a first digital content selection policy) and a second performance value (e.g., indicating a second probability of user interaction corresponding to a second digital content selection policy). The policy modeling system can then compare the first performance value and the second performance value to select and execute a digital content selection policy.

The policy modeling system can execute a policy in a variety of ways. For example, in one or more embodiments, the policy modeling system executes a selected policy by implementing the selected policy online and providing item lists of digital content to client devices of end-users in accordance with the target policy. The policy modeling system can also execute the target policy by selectively conducting an online A/B hypothesis test on a selected policy. Indeed, the policy modeling system can improve the accuracy and efficiency of online A/B hypothesis testing by selecting a policy utilizing an item-level importance sampling model described in accordance with one or more embodiments.

The policy modeling system provides a number of advantages over conventional digital content testing and distribution systems. For example, by training and utilizing an item-level importance sampling model, the policy modeling system can improve accuracy. In particular, the policy modeling system can reduce bias, reduce variance, and reduce provision of erroneous digital content to client devices. For example, the policy modeling system can accurately predict performance of digital content selection policies and select policies to execute (e.g., policies that will result in highest end-user engagement or conversions). The policy modeling system can then execute these policies as part of online testing or in executing a digital content campaign. For example, the policy modeling system can improve the accuracy of A/B hypothesis testing by utilizing policies selected by the policy modeling system. Similarly, the policy modeling system can improve the accuracy of digital content campaigns by implementing digital content selection policies with the highest percentage of user interactions. Accordingly, the policy modeling system can reduce the number of end-user client devices that receive erroneous or less effective digital content. In this manner, the policy modeling system can also improve viewer experience and reduce the number of users that navigate to other websites.

The policy modeling system can also reduce expense while improving efficiency and flexibility. Indeed, in one or more embodiments, the policy modeling system can determine accurate performance values associated with target policies without performing online testing with respect to each of the target policies. The policy modeling system can also utilize historical training data to flexibly analyze a variety of different target policies (in a replicable manner). Thus, the policy modeling system can train any number of item-level importance sampling models to effectively predict values of multiple target models prior to (or as an alternative to) performing an online A/B hypothesis test. In this way, the policy modeling system avoids expenses and computing burdens associated with unnecessary online policy testing in addition to reducing negative experiences of end-users with respect to less effective target policies.

The policy modeling system also increases efficiency over conventional systems that model at a list level. Indeed, by determining item-level importance weights and applying the item-level importance weights to interactions from the training data, the policy modeling system trains the item-level importance sampling model to determine a performance value indicating a probability that a target user will interact with item lists presented in accordance with the target policy while consuming significantly less processing resources. For example, by training the item-level importance sampling model at an item-level (rather than a list-level), the policy modeling system can analyze any training data that includes a particular item (rather than training items with a matching list). The policy modeling system can thus flexibly expand available training data and analyze multiple combinations of digital items within lists by leveraging item-level structural detail within each training sample. Accordingly, the policy modeling system can accurately determine a value of one or more target policies while significantly reducing consumption of computational resources.

In addition, as will be described in further detail below, the policy modeling system can flexibly train the item-level importance sampling model in accordance with different behavioral models that enable the policy modeling system to efficiently and accurately determine performance values. For example, in one or more embodiments, the policy modeling system reduces computational expense while reducing potential bias by training an item-position importance sampling model based on both a position and content of a digital content item. As another example, in one or more embodiments, the policy modeling system reduces computation expense and bias by training a content-based importance sampling model based on content and independent of position of a digital content item within an item list. Accordingly, the policy modeling system can improve performance with regard to a variety of underlying behavioral models.

As illustrated in the foregoing discussion, the present disclosure utilizes a variety of terms to describe features and advantages of the policy modeling system. Additional detail is now provided regarding the meaning of such terms. For instance, as used herein, a "digital content selection policy" (or "policy") refers to one or more rules, processes, or algorithms for selecting digital content to provide to a client device. In particular, a digital content selection policy includes one or more rules for selecting digital content items in an item list to provide to a client device. In one or more embodiments described herein, a policy includes a conditional probability distribution over item lists. More specifically, a policy can include a probability distribution over items lists for one or more contexts (e.g., feature vectors). For example, given a context, a policy modeling system can identify an item list from a distribution of item lists defined by a corresponding digital content selection policy.

A digital content selection policy can include a "training content selection policy" (or "training policy") or a "target content selection policy (or "target policy"). A training policy refers to a content selection policy used to train an item-position importance sampling model. For example, a training policy may refer to a digital content selection policy corresponding to a set of tracked digital interactions with digital content items presented to test users. A target policy refers to a content selection policy analyzed to determine a performance value. For example, a target policy includes a digital content selection policy analyzed by an item-position importance sampling model to generate a prediction corresponding to the content selection policy.

As used herein, a "digital content item" refers to an electronic item. In particular, a digital content item includes an electronic item provided for display within an item list presented in accordance with a digital content selection policy. As mentioned above, a digital content item can include a digital image, a digital video, digital text, an electronic document, a digital link, a preview of a webpage, or other type of digital content presented within a list including other digital content items. As used herein, a "content item list" (or "item list" or simply "list") refers to a collection of digital content items. In particular, an item list includes a collection of digital content items presented for display via a graphical user interface of a client device. For example, an item list can refer to a vertical list, horizontal list, a grid, or other ordered presentation of digital content items presented to a user. As indicated above, the list can include selected digital content items in a particular order in accordance with a corresponding content selection policy.

As used herein, a "digital interaction" (or "interaction") refer to data associated with one or more actions taken by a user via a client device. In particular, digital interaction includes an indication of one or more actions with respect to a digital content item presented to the user via a client device. For example, a digital interaction can refer to an identification of a click, download, save, purchase, or other observable action taken by a user with respect to a digital content item via a client device. In addition, a digital interaction can include data associated with the digital content item with which the user interacts. For example, interaction data can include an identification of the digital content item itself, a placement of the digital content item within a presented item list when displayed, an identification of one or more actions taken with respect to the digital content item, and other data associated with the interaction.

As used herein, an "item-level importance sampling model" refers to a computer model or algorithm that analyzes individual digital content items and/or positions within item lists sampled from a training policy to predict performance of a target policy. In particular, an item-level importance sampling model includes a behavioral model or machine learning model that samples item lists selected in accordance with a training policy and analyzes individual positions and/or individual digital content items in the sampled item lists to determine a performance value of a target policy. For example, an item-level importance sampling model includes an algorithm that analyzes individual digital content items and/or positions within item lists sampled from a training policy independently of the other digital content items and/or positions with the item lists to predict performance a target policy. Additional detail regarding an item-level importance sampling model is provided below (e.g., in relation to FIGS. 3-5).

As mentioned above, the policy modeling system trains the importance sampling model based on item-level importance weights. As used herein, an "item-level importance weight" refers to a determined weight for a sample from training data. In particular, an "item-level importance weight" includes a determined weight for a position and/or digital content item in an item list selected in accordance with a training policy. As described in greater detail below, the policy modeling system can determine an "item-level importance weight" by comparing a training policy and a target policy (e.g., a distribution of item lists in a training policy and a distribution of item lists in a target policy). For example, an item-level importance weight for a digital content item can refer to a ratio, multiplier, or other weighting factor that reflects a higher, lower, or similar frequency that the digital content item appears in item lists generated in accordance with the target policy versus a frequency that the digital content item appears in item lists generated in accordance with the training policy.

As mentioned above, the policy modeling system can determine the item-level importance weights based on an "item-level selection probability." As used herein, an "item-level selection probability" refers to a probability that a position and/or digital content item will be selected. In particular, an "item-level selection probability" includes a probability that a position and/or digital content item will be selected as part of an item list in accordance with a content selection policy. An item-level selection probability can include "training item-level selection probabilities" and "target item-level selection probabilities." For example, a training item-level selection probability includes a probability that a position and/or digital content item will be selected in accordance with a training policy. Similarly, a target item-level selection probability includes a probability that a position and/or digital content item will be selected in accordance with a target policy.

As mentioned above, the policy modeling system can utilize item-level importance weights to determine adjusted user interaction probabilities. As used herein, an "adjusted user interaction score" refers to an indication of a likelihood of a digital interaction, where the likelihood is generated based on an item-level importance weight. For example, the policy modeling system can apply an item-level importance weight to a tracked interaction to determine an adjusted user interaction score for the tracked interaction that more accurately reflects a likelihood that the digital content item will appear (and additionally engage a target user) in accordance with a target policy. As will be described in further detail below, the policy modeling system can utilize adjusted user interaction scores to estimate whether a target user will interact with an item list presented in accordance with the target policy.

As mentioned above, the policy modeling system can train an item-level importance sampling model that determines a performance value of a target policy. As used herein, a "performance value" for a target policy (or other digital content selection policy) refers to one or more metrics associated with a predicted performance of the target policy. For example, a performance value for a target policy may include an indication of a probability of user interaction with one or more item lists presented in accordance with the target policy. For instance, a performance value may include an indication of a probability that a given user will interact with one or more digital content items within an item list presented in accordance with the target policy. Thus, a performance value may include an indication of a number (or average) of predicted interactions (e.g., clicks, purchases, downloads) from multiple target users with respect to item lists presented in accordance with the target policy.

As mentioned above, in one or more embodiments, the policy modeling system applies a clipping constant or threshold value when training an importance sampling model. As used herein, a "clipping constant" or "clipping threshold" refers to a value, ratio, or other value that constrains or reduces an effect of one or more interactions when training the importance sampling model. For example, a clipping threshold can refer to a maximum item-level importance weight for a given digital content item and/or an adjusted user interaction score for one or more user interactions.

Additional detail will now be provided regarding the policy modeling system in relation to illustrative figures portraying exemplary embodiments. For example, FIG. 1 illustrates an example environment 100 for training and executing item-level importance sampling models to estimate or otherwise determine a performance value for a target policy. As shown in FIG. 1, the environment 100 includes a server device(s) 102 including a campaign management system 104 and policy modeling system 106. The environment 100 further includes client devices 108a-n associated with respective users 110a-n. The environment 100 also includes a testing server device(s) 112 including an online testing system 114.

As shown in FIG. 1, the server device(s) 102, client devices 108a-n, and testing server device(s) 112 can communicate with each other directly or indirectly through the network 116. The network 116 may include one or multiple networks and may use one or more communication platforms or technologies suitable for transmitting data. In one or more embodiments, the network 116 includes the Internet or World Wide Web. In addition, or as an alternative, the network 116 can include other types of communication networks as described below (e.g., in relation to FIG. 10).

Moreover, as shown in FIG. 1, the environment 100 includes the client devices 108a-n. The client devices 108a-n may refer to various types of computing devices. For example, one or more of the devices may include a mobile device such as a mobile telephone, a smartphone, a PDA, a tablet, or a laptop. Additionally, or alternatively, one or more of the devices may include a non-mobile device such as a desktop computer.

In addition, as shown in FIG. 1, the environment 100 includes the server device(s) 102 and the testing server device(s) 112. The server device(s) 102 and the testing server device(s) 112 can generate, store, receive, and/or transmit any type of data, including digital content items, item lists, and/or training data. For example, the server device(s) 102 may receive data from the client device 108a and send the data to client device 108b. In one or more embodiments, the server device(s) 102 and the testing server device(s) 112 may comprise data servers. The server device(s) 102 and the testing server device(s) 112 can also comprise communication servers or web-hosting servers. Additional detail regarding client devices and server devices is provided below (e.g., in relation to FIG. 10).

As shown in FIG. 1, the server device(s) 102 can include the campaign management system 104 and policy modeling system 106. The campaign management system 104 can manage, operate, run, and/or execute a digital content campaign. For example, the campaign management system 104 can receive digital content from a publisher or advertiser, receive or generate campaign parameters (e.g., a budget, campaign duration, or digital content selection policies), and then provide the digital content in accordance with the campaign parameters. For instance, the campaign management system 104 can detect, in real-time, the client device 108a navigating to a digital asset (e.g., a website) with a corresponding impression opportunity (e.g., with an advertising slot). While the client device 108a navigates to and loads the digital asset, the campaign management system 104 (utilizing the policy modeling system 106) can utilize a digital content selection policy to select and provide digital content items as part of an item list to the client device 108a (all within a matter of milliseconds).

Moreover, as shown in FIG. 1, the testing server device(s) 112 can also include the online testing system 114. The online testing system 114 can perform one or more tests with regard to digital content selection parameters. For example, the online testing system 114 can perform A/B hypothesis testing. Specifically, the online testing system 114 can provide digital content in item lists to test user client devices (e.g., the client devices 108b, 108n) in accordance with different digital content selection policies, monitor user interaction with the digital content, and compare the results for the different digital content selection policies. Moreover, As shown in FIG. 1, the campaign management system 104 and policy modeling system 106 are implemented on the server device(s) 102 while the online testing system 114 is implemented on the testing server device(s) 112. Nevertheless, in one or more embodiments, the online testing system 114 is implemented in whole (or in part) on the server device(s) 102. In addition, the campaign management system 104 and/or policy modeling system 106 can be implemented in whole (or in part) on the testing server device(s) 112.

Although FIG. 1 illustrates a particular number and arrangement of client devices 108a-n corresponding to respective users 110a-n, it will be understood that the environment 100 can include any number of devices, including any number of server devices or client devices. Moreover, one or more of the devices may directly communicate with the server device(s) 102 and/or testing server device(s) 112 or via an alternative communication network, bypassing the network 116.

By way of example, in one or more embodiments, the policy modeling system 106 (e.g., via the server device(s) 102) collects training data including logged interactions by training users (e.g., users 110a-n) with respect to digital content items selected and presented within item lists in accordance with a training policy. For example, the policy modeling system 106 can generate a training policy (or identify an existing content selection policy) and provide item lists to some or all of the client devices 108a-n. Alternatively, in one or more embodiments, the policy modeling system 106 receives logged interactions in accordance with a training policy (e.g., an unknown training policy that the policy modeling system estimates based on the logged interactions). In one or more embodiments, the client devices 108a-n receive the item lists in accordance with the training policy from the server device(s) 102. Alternatively, in one or more embodiments, the client devices 108a-n receive the item lists in accordance with the training policy from the testing server device(s) 112.

The policy modeling system 106 can observe, track, or otherwise receive a record of interactions by the users 110a-n with respect to the item lists presented via the client devices 108a-n in a variety of ways. For example, in one or more embodiments, the online testing system 114 collects or otherwise tracks interactions on the client devices 108a-n with digital content in item lists and provides training data including a record of the interactions and associated information to the policy modeling system 106. Alternatively, the online testing system 114 can track interactions with the presented item lists and cause the testing server device(s) 112 to provide interaction data to the server device(s) 102.

Moreover, the policy modeling system 106 can receive (e.g., from a publisher client device) a target policy and predict performance of the target policy in light of the observed interactions with the training policy. In particular, the policy modeling system 106 (via the server device(s) 102) can train an item-level importance sampling model to predict one or more performance values for the target policy. For example, as mentioned above, the policy modeling system 106 can determine item-level importance weights for digital content items based on the training policy and the target policy. The policy modeling system 106 can additionally apply the item-level importance weights to interactions from the training data to determine a performance value for the target policy. As will be described in further detail below, the policy modeling system 106 can train one or more types of item-level importance sampling models in a variety of ways.

In addition to training the item-level importance sampling model to determine one or more performance values associated with the target policy, the policy modeling system 106 (e.g., via the server device(s) 102) can additionally execute a target policy in a variety of ways. For example, the policy modeling system 106 (e.g., via the server device(s) 102) can execute a target policy by detecting a user client device (e.g., the client device 108a) navigating to a digital asset (e.g., a website), utilizing the target policy to select item lists for the client device in accordance with the target policy, and providing the item lists to one or more of the client devices 108a-n (all within milliseconds while the client device navigates to and loads the webpage).

In one or more embodiments, the policy modeling system 106 executes the target policy by providing the target policy to the testing server device(s) 112 for online testing. For example, the online testing system 114 can implement an online test of the target policy to support or otherwise verify the accuracy of estimations generated by the item-level importance sampling model. In one or more embodiments, the policy modeling system 106 or online testing system 114 performs an online A/B hypothesis test between the identified target policy and one or more additional content selection policies.

Figure 2:
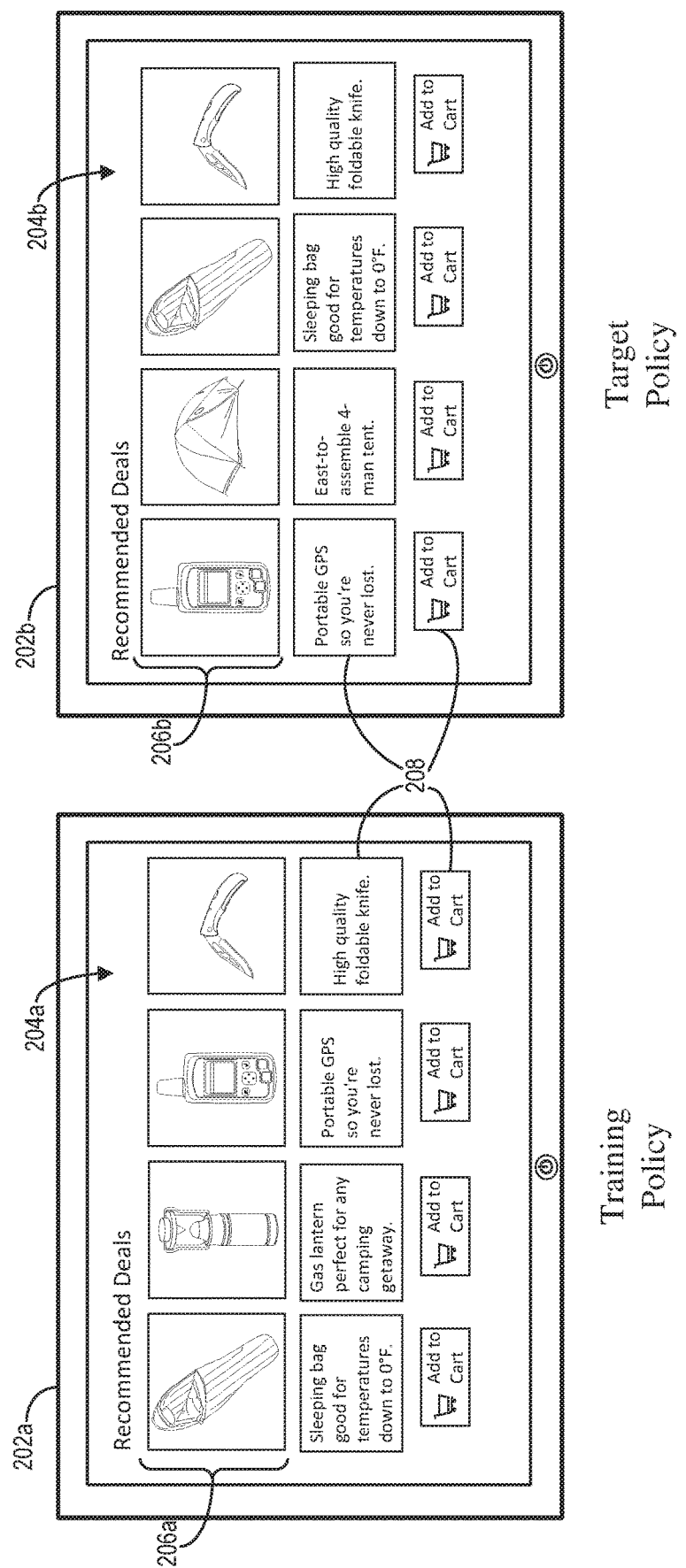
FIG. 2 illustrates example item lists presented in accordance with digital content item selection policies in accordance with one or more embodiments.

As mentioned above, in one or more embodiments, the policy modeling system 106 generates item lists comprising a plurality of customized digital content items in accordance with content selection policies and provides the item lists for display to one or more client devices. FIG. 2 illustrates example client devices 202a-b including graphical user interfaces 204a-b on which item lists 206a-b are presented in accordance with one or more embodiments. As shown in FIG. 2, a first graphical user interface 204a of a first client device 202a includes a first item list 206a which itself includes a first plurality of digital content items presented in accordance with a first digital content selection policy (e.g., a training policy). In contrast, the second graphical user interface 204b of the second client device 202b includes a second item list 206b including a plurality of digital content items presented in accordance with a second digital content selection policy (e.g., a target policy). As shown in FIG. 2, the item lists 206a-b include one or more different digital content items in unique orders based on differences in the content item selection policies.

In particular, as shown in FIG. 2, the first item list 206a includes four digital content items displayed at respective positions within the item list 206a in accordance with a first digital content selection policy. For example, the first item list 206a includes an image for a sleeping bag at a first position, an image for a lamp at a second position, an image for a phone at a third position, and an image for a knife at a fourth position. Similarly, the second item list 206b includes four digital content items displayed at respective positions within the item list 206b in accordance with a second digital content selection policy. In contrast to the first item list 206a, the second item list 206b includes an image for a phone at a first position, an image for a tent at a second position, an image for a sleeping bag at a third position, and an image for a knife at a fourth position.

As shown in FIG. 2, item lists generated based on the different content item selection policies can include various differences. For example, as shown in FIG. 2, the item lists 206a-b include many of the same images presented within the respective list (e.g., the images for the sleeping bag, phone, and knife) at different positions within the item lists 206a-b. In addition, as shown in FIG. 2, the item lists 206a-b include one or more images not included within the other item list (e.g., the images for the lamp and tent). As further shown, the item lists 206a-b can include one or more of the same images presented at the same location (e.g., the image of the knife at the fourth position).

In one or more embodiments, the policy modeling system 106 generates and provides the item lists in accordance with a digital content selection policy and further based on a context associated with a given user. As used herein a "context" or "user context" refers to one or more characteristics of a client device and/or user to which an item list is presented. For example, context can include demographic information (e.g., age or gender), location, device type (e.g., mobile device or personal computer), operating system type, time of day (e.g., daypart), or application type (e.g., type of web browser utilized to navigate to a website). In one or more embodiments, user context is encoded as a feature vector including one or more values corresponding to characteristics of a user (e.g., training user, target user) and/or corresponding client device and which the policy modeling system 106 can utilize in determining a selection of digital content items to include within an item list. For example, in one or more embodiments, a digital content selection policy refers to a distribution of lists corresponding to a range of lists conditioned on contexts corresponding to different types or demographics of users. In the example shown in FIG. 2, the item lists 206a-b may represent item lists 206a-b presented to users having the same or similar contexts in accordance with the respective content item selection policies.

As further shown in FIG. 2, the graphical user interfaces 204a-b includes additional selectable options 208 associated with digital content items presented within the item lists 206a-b. For example, a user can select an item description including a link to cause a client device to navigate to a product page corresponding to the digital content item. In addition, a user can select an add-to-cart button to add a product to a shopping cart or purchase a product. As mentioned above, the policy modeling system 106 can collect, receive, or otherwise obtain interaction data including instances of user interactions with various types of selectable options including clicks, purchases, or other information associated with the presented item lists.

Figure 3:
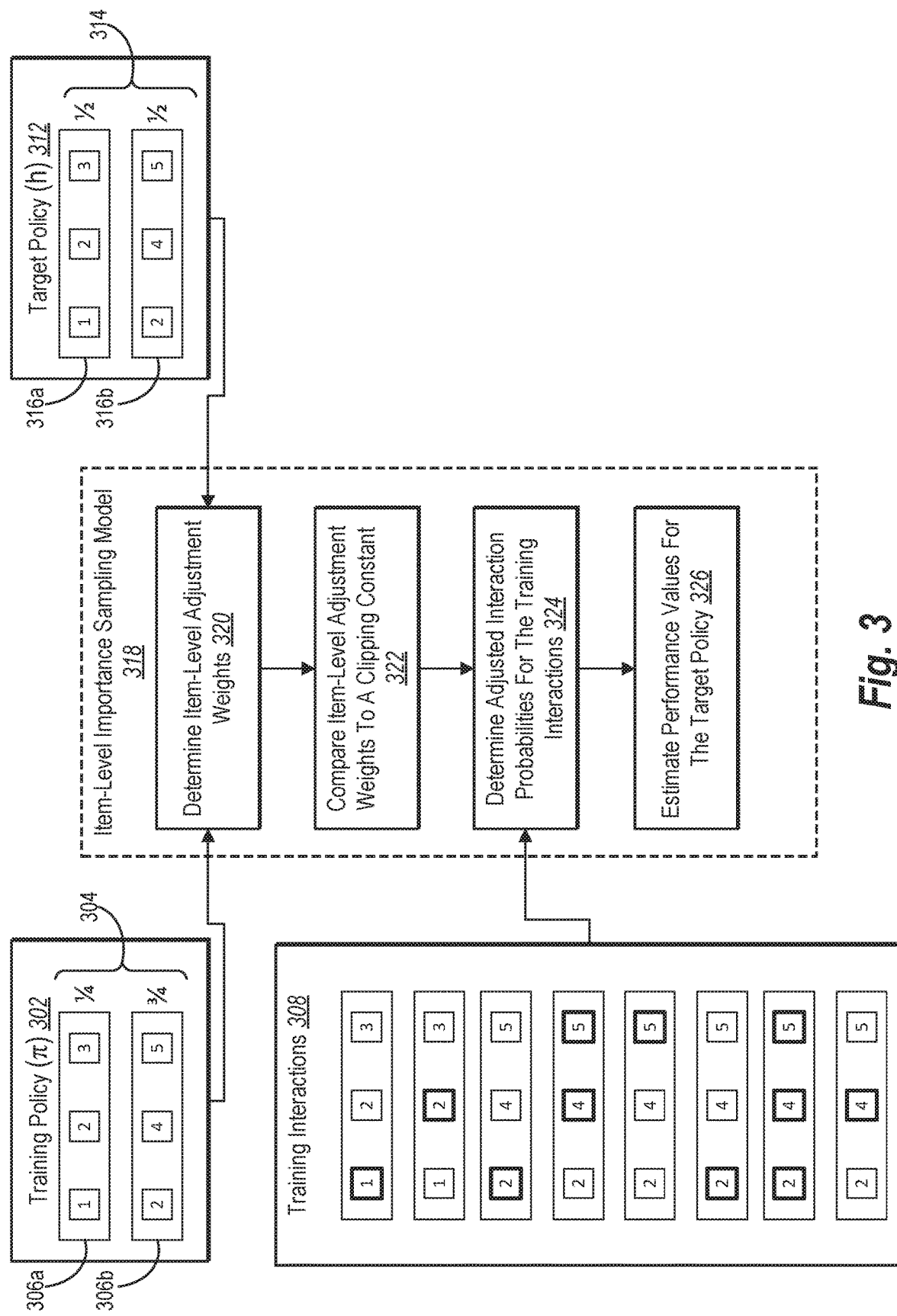
FIG. 3 illustrates training an example item-level importance sampling model in accordance with one or more embodiments.

As mentioned, the policy modeling system 106 can predict performance of different digital content selection policies, select a digital content selection policy based on the predicted performance, and execute the digital content selection policy as part of a digital content campaign. Specifically, the policy modeling system 106 can train an item-level importance sampling model to predict performance and select a digital content selection policy. For example, FIG. 3 illustrates the policy modeling system 106 training an item-level importance sampling model to determine a performance value for a target policy. In particular, as shown in FIG. 3, the policy modeling system 106 trains an item-level importance sampling model 318 based on a training policy ($\pi$) 302 (hereinafter "training policy 302") and a target policy (h) 312 (hereinafter "target policy 312").

As shown in FIG. 3, the training policy 302 and target policy 312 include different distributions of item lists. For example, the training policy 302 includes a distribution of item lists 306a-b and content item ratios 304 corresponding to a frequency in which corresponding item lists 306a-b are presented in accordance with the training policy 302. In particular, the first item list 306a of the training policy 302 corresponds to a 1/4 ratio indicating that the first item list 306a is presented in one-quarter of item lists of the training policy 302. In addition, the second item list 306b of the training policy 302 corresponds to a 3/4 ratio indicating that the second item list 306b is provided in three-quarters of item lists of the training policy 302.

FIG. 3 additionally illustrates a record of training interactions 308 with respect to a distribution of item lists selected and presented in accordance with the training policy 302. For example, the training interactions 308 include two instances of the first item list 306a and six instances of the second item list 306b (reflective of the ratios 304 of the training policy 302). As further shown, the training interactions 308 includes detected clicks, downloads, or other tracked interactions with respect to the presented item lists. As shown in FIG. 3, the detected interactions are denoted by a bold indication around individual digital content items. In particular, the record of training interactions 308 indicates that each item list includes at least one detected interaction with several item lists including multiple detected interactions.

As illustrated in FIG. 3, the target policy 312 includes item lists 316a-b including similar digital content items (denoted 1, 2, and 3) as the item lists 306a-b of the training policy 302. In contrast to the training policy 302, however, the target policy 312 includes different content item ratios 314 for the respective item lists 316a-b. For example, the target policy 312 includes a 1/2 ratio for the first item list 316a indicating that the first item list 316a is presented in one-half of item lists of the target policy 312. In addition, the target policy 312 includes a 1/2 ratio for the second item list 316b indicating that the second item list 316b is presented in one-half of item lists of the target policy 312.

As shown in FIG. 3, the policy modeling system 106 trains the item-level importance sampling model 318 by performing acts 320-326. In particular, the policy modeling system 106 performs an act 320 of determining item-level importance weights based on distributions of item lists of the training policy 302 and target policy 312. In particular, the policy modeling system 106 determines item-level importance weights based on rates at which individual content items appear within the item lists 306a-b for the training policy 302 and item lists 316a-b of the target policy 312. For example, in one or more embodiments, the policy modeling system 106 determines an item-level importance weight for a digital content item by comparing policy ratios 304 from the training policy 302 to policy ratios 314 from the target policy 312. In one or more embodiments, the policy modeling system 106 determines item-level importance weights for each of the digital content items represented within a distribution of item lists 306a-b of the training policy 302.

As shown in FIG. 3, the policy modeling system 106 also performs the act 322 of comparing the item-level importance weights to a clipping threshold. In particular, in one or more embodiments, the policy modeling system 106 compares each of the determined item-level importance weights to a predetermined clipping threshold. Based on the comparison, the policy modeling system 106 can determine whether to use the determined item-level importance weight or the clipping threshold in training the item-level importance sampling model 318. For example, in one or more embodiments, the policy modeling system 106 determines whether to disregard or otherwise discount an item-level importance weight based on the comparison between the item-level importance weight and the clipping threshold.

As shown in FIG. 3, the policy modeling system 106 also performs the act 324 of determining adjusted user interaction scores for the training interactions 308. In particular, for each tracked interaction with a digital content item, the policy modeling system 106 can determine whether to apply the clipping threshold or an item-level importance weight for the digital content item in order to determine an adjusted user interaction score for the tracked interaction. For example, where the policy modeling system 106 determines that an item-level importance weight is less than the clipping threshold, the policy modeling system 106 can apply the item-level importance weight to each tracked interaction. Alternatively, where the policy modeling system 106 determines that an item-level importance weight exceeds the clipping threshold, the policy modeling system 106 can instead apply the clipping threshold to one or more tracked interactions.

Moreover, as illustrated, the policy modeling system 106 also performs the act 326 of estimating one or more performance values for the target policy 312. In particular, the policy modeling system applies the item-level importance weights and/or clipping threshold to tracked interactions to estimate performance values for the target policy 312. For example, the policy modeling system 106 can apply item-level importance weights (or alternatively, a clipping threshold) to each interaction from the tracked training interactions 308 to generate adjusted user interaction scores. The policy modeling system 106 can further sum, average, or otherwise combine the adjusted user interaction scores to determine a performance value for the target policy that indicates a probability that a target user will interact with a given item list presented to the target user in accordance with the target policy 312.

Figure 4:
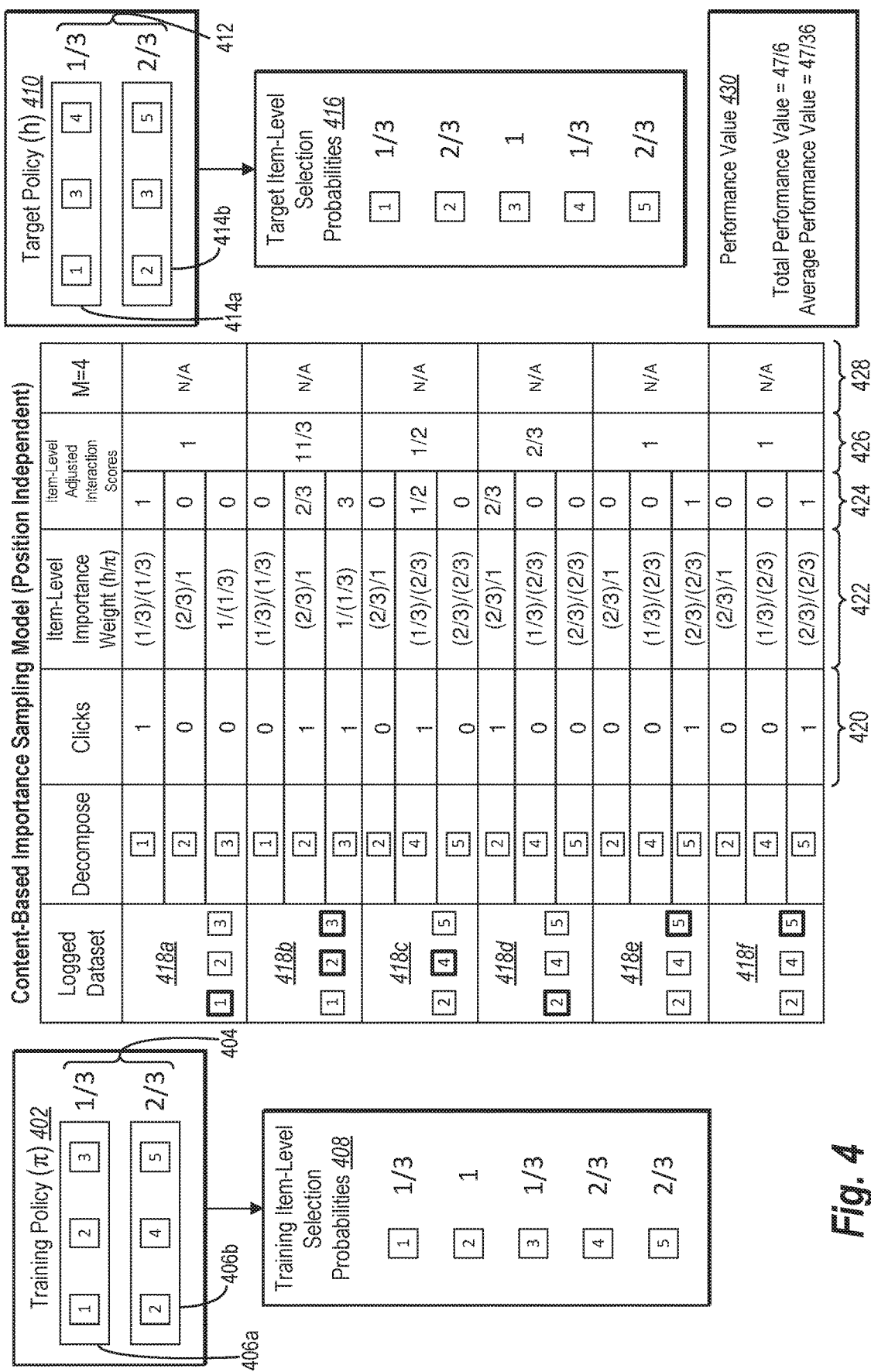
FIG. 4 illustrates training an example content-based important sampling model in accordance with one or more embodiments.

As mentioned above, the policy modeling system 106 can train an item-level importance sampling model that reflects different behavioral models. For instance, FIG. 4 illustrates an example embodiment of training a content-based importance sampling model to output a performance value that indicates a probability of interaction based on content of digital content items but independent of placement or position of the digital content items within respective item lists. For example, the policy modeling system 106 trains the content-based importance sampling model under an assumption that there is no position bias and that a training user interacted with the digital content items based only on the relevance or attraction of the digital content item (e.g., to the individual training user).

For example, as shown in FIG. 4, the policy modeling system 106 can identify training policy (π) 402 (hereinafter "training policy 402") including a distribution of item lists 406a-b and content item ratios 404 corresponding to a frequency in which corresponding item lists 406a-b are selected and presented in accordance with the training policy 402. In one or more embodiments, the policy modeling system 106 receives the training policy 402 including the item lists 406a-b and corresponding content item ratios 404. Alternatively, in one or more embodiments, the policy modeling system 106 compiles, identifies, or otherwise receives a dataset including tracked interactions and estimates the training policy based on the dataset of interactions.

As shown in FIG. 4, the policy modeling system 106 also identifies training item-level selection probabilities 408 corresponding to rates at which individual digital content items appear within the item lists 406a-b of the training policy 402. For example, digital content item "1" corresponds to an item-level selection probability value of "1/3" based on a determination that "1" appears within the item lists 406a-b of the training policy 402 one-third of the time. As another example, digital content item "2" corresponds to an item-level selection probability value of "1" based on a determination that content item "2" appears within both (e.g., all) of the item lists 406a-b of the training policy 402. The training item-level selection probabilities 408 additionally shows that the digital content item "3" corresponds to an item-level selection probability value of "1/3," the digital content item "4" corresponds to an item-level selection probability value of "2/3," and the digital content item "5" corresponds to an item-level selection probability value of "2/3."

As further shown in FIG. 4, the policy modeling system 106 also identifies target policy (h) 410 (hereinafter "target policy 410") including a distribution of item lists 414a-b and content item ratios 412 corresponding to a frequency in which corresponding item lists 414a-b are selected and presented in accordance with the target policy 410. As illustrated in FIG. 4, the target policy 410 includes a first item list 414a including digital content items "1-3-4" that appear in one-third of item lists selected in accordance with the target policy 410 and a second item list 414b including digital content items "2-3-5" that appear in two-thirds of item-lists selected in accordance with the target policy 410.

Similar to the training item-level selection probabilities 408 for the training policy 402, the policy modeling system 106 can identify target item-level selection probabilities 416 corresponding to the rates at which individual digital content items appear within the item lists 414a-b of the target policy 410. For example, digital content item "1" corresponds to an item-level selection probability value of "1/3" based on a determination that "1" appears within the item lists 414a-b of the target policy 410 one-third of the time (i.e., within the target policy 410). The target item-level selection probabilities 416 additionally shows that the digital content item "2" corresponds to an item-level selection probability value of "2/3," the digital content item "3" corresponds to an item-level selection probability value of "1," the digital content item "4" corresponds to an item-level selection probability value of "1/3," and the digital content item "5" corresponds to an item-level selection probability value of "2/3."

As mentioned above, the policy modeling system 106 can detect, collect, or otherwise receive tracked interactions with respect to item lists selected and presented to training users in accordance with the training policy 402. For example, FIG. 4 illustrates a logged dataset including presented item lists 418a-f and tracked clicks 420 with respect to the presented item lists 418a-f. In particular, the logged dataset includes a first presented item list 418a in which digital content items "1-2-3" were presented and digital content item "1" was clicked. The logged dataset also includes a second presented item list 418b in which the digital content items "1-2-3" were presented and digital content items "2" and "3" were both clicked. The logged dataset further includes additional presented item lists 418c-f as shown in FIG. 4.

As further shown in FIG. 4, the policy modeling system 106 decomposes the item lists and compile a record of detected clicks 420 with respect to the digital content items. In particular, the policy modeling system 106 compiles a record of detected clicks 420 with respect to individual digital content items, as shown in FIG. 4.

The policy modeling system 106 can additionally determine item-level importance weights 422 between the target policy 410 and the training policy 402. In one or more embodiments, the policy modeling system 106 determines the item-level importance weight by determining a ratio between target item-level selection probabilities 416 for the target policy 410 and corresponding training item-level selection probabilities 408 for the training policy 402 (as denoted by "h/π"). As shown in FIG. 4, the policy modeling system 106 determines item-level importance weights for each of the item-level selection probability values from the respective item-level selection probabilities 408, 416 corresponding to common digital content items.

The policy modeling system 106 can further apply the determined item-level importance weights 422 to the tracked interactions from the training data to determine adjusted user interaction scores corresponding to respective interactions. For example, the policy modeling system 106 can determine item-level adjusted user interaction scores by applying an item-level importance weight to a tracked interaction or non-interaction (e.g., clicks 420).

As shown in FIG. 4, for example, the policy modeling system 106 determines an item-level importance weight corresponding to the first digital content item. In particular, the policy modeling system 106 determines the item-level importance weight for the first digital content item by dividing the target item-level selection (1/3) by the training item-level selection probability (1/3) for the first digital content item. The policy modeling system 106 then applies the item-level importance weight (1/3÷1/3) to the tracked click ("1") corresponding to the digital content item. By applying the item-level importance weight to the tracked interaction from the first presented item list 418a of the logged dataset, the policy modeling system 106 determines an item-level adjusted user interaction score of "1" for the first digital content item in the first presented item list 418a of the logged dataset.

The policy modeling system 106 similarly generates item-level adjusted user interaction scores for other digital content items in the first presented item list 418a. Specifically, the policy modeling system 106 applies item-level importance weights corresponding to the second and third digital content items from the first presented item list 418a to determine item-level adjusted user interaction scores for the respective interactions (or non-interactions).

The policy modeling system 106 can similarly determine item-level adjusted user interaction scores 424 for each digital content item presented within the presented item lists 418a-f as shown in FIG. 4. For example, with respect to the third presented item list 418c, the policy modeling system 106 identifies a click for the fourth digital content item. The policy modeling system 106 determines an item-level importance weight based on the training item-level selection probability and the target item-level selection probability for the fourth digital content item (i.e., 1/3÷2/3). The policy modeling system 106 then applies the item-level importance weight to determine an item-level adjusted interaction probability (i.e., 1/2).

As further shown in FIG. 4, the policy modeling system 106 can determine a total adjusted user interaction score 426 for each interaction based on the item-level adjusted user interaction scores 424. For example, with respect to the first presented item list 418a, the policy modeling system 106 sums the item-level interaction probabilities (1+0+0) to calculate a total adjusted user interaction score of "1" representative to a sum of clicks for the first presented item list 418a. As another example, with respect to the second presented item list 418b, the policy modeling system 106 sums item-level interaction probabilities (0+2/3+3) to calculate a total adjusted user interaction score of "11/3" representative of the sum of clicks for the second presented item list 418b. The policy modeling system 106 can similarly determine total adjusted user interaction scores 426 for each of the presented item lists 418a-f from the logged dataset.

As mentioned above, in one or more embodiments, the policy modeling system 106 applies a clipping threshold. For example, in relation to FIG. 4, the policy modeling system 106 applies a clipping threshold (M) 428 (hereinafter "clipping threshold 428") to the item-level importance weights 422 and/or adjusted user interaction scores 424, 426. In particular, the policy modeling system 106 may determine or assign a clipping threshold 428 to limit variability or bias of the item-level importance sampling model in predicting interaction by target users with respect to item lists. In the example shown in FIG. 4, the policy modeling system 106 assigns an M-value of "4" for the clipping threshold 428. Accordingly, if an item-level importance weight or, alternatively, an adjusted user interaction score for a presented item list (or individual digital content item) exceeds a value of "4," the policy modeling system 106 can train the item-level importance sampling model using the clipping threshold rather than the determined adjusted user interaction score.

In the example shown in FIG. 4, the policy modeling system 106 compares the clipping threshold 428 to each of the item-level importance weights 422 to determine whether to utilize the clipping threshold 428 or the item-level importance weight in training the item-level importance sampling model. Because each of the item-level importance weights are less than the clipping threshold 428, the policy modeling system 106 trains the item-level importance sampling model based on the item-level importance weights. As another example, however, where the clipping threshold 428 is assigned a value of "2," the policy modeling system 106 would utilize the clipping threshold 428 in place of the item-level importance weight "3" for the third digital content item in the second presented item list 418b (i.e., based on a determination that the item-level adjusted user interaction score value of "3" exceeds the clipping threshold value of "2").

In one or more embodiments, the policy modeling system 106 determines a performance value 430 based on the adjusted user interaction scores. In particular, as shown in FIG. 4, the policy modeling system 106 determines a total performance value of "47/6" based on a sum of the item-level adjusted user interaction scores 426. As further shown, the policy modeling system 106 determines an average performance value of "47/36" based on an average of the list-level adjusted user interaction scores 426. In one or more embodiments, the performance value 430 indicates a predicted probability that a target user will interact with one or more digital content items from an item list selected and presented to the target user in accordance with the target policy 410.

Figure 5:
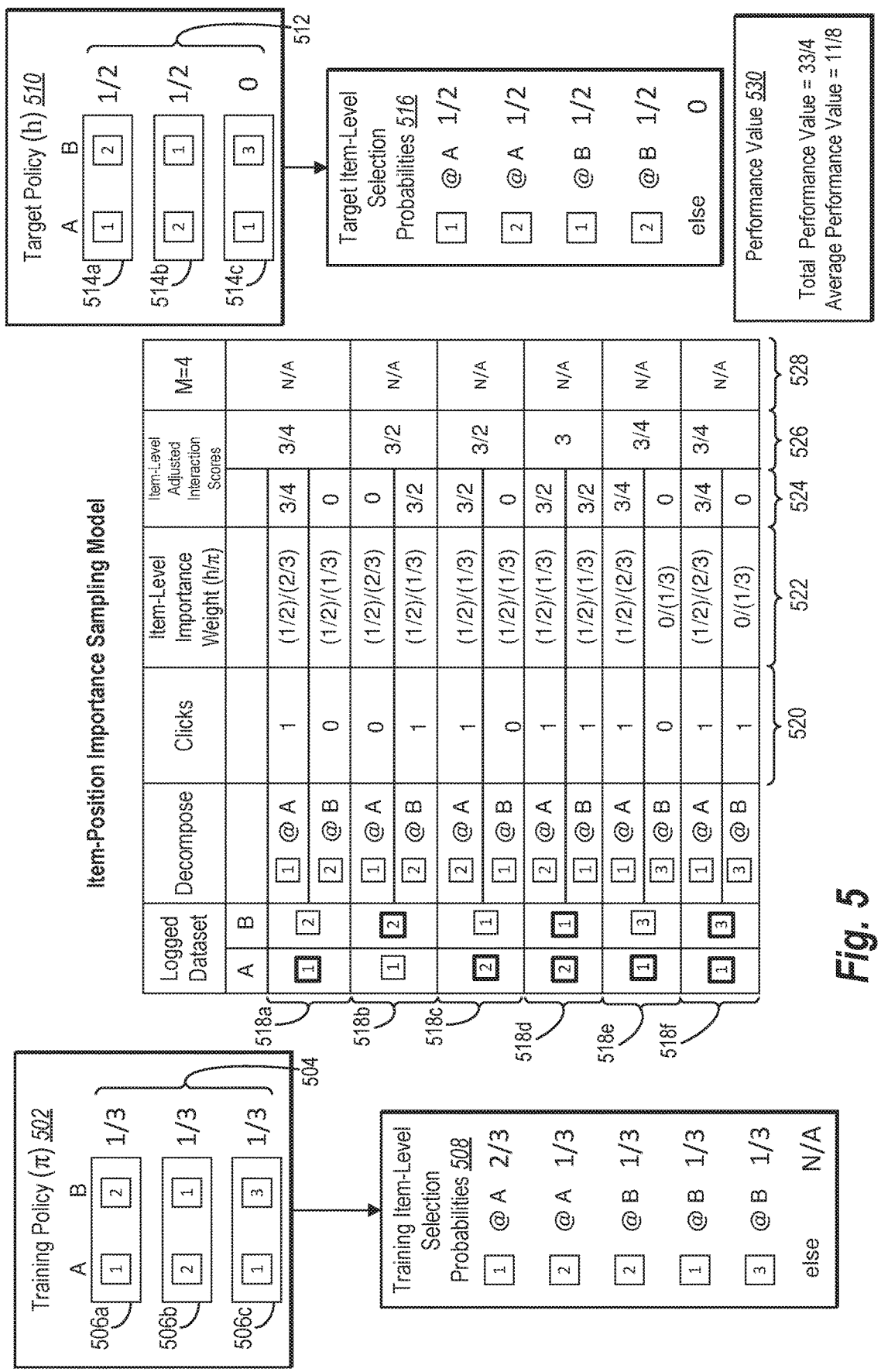
FIG. 5 illustrates training an example item-importance sampling model in accordance with one or more embodiments.

While FIG. 4 illustrates an example in which the policy modeling system 106 trains a content-based importance sampling model, FIG. 5 illustrates another example in which the policy modeling system 106 trains an item-level importance sampling model corresponding to a different behavioral model. In particular, FIG. 5 illustrates an example embodiment of training an item-position importance sampling model that determines a performance value that indicates a probability of interaction with a digital content item based on both content and position of digital content items within item lists.

For example, as shown in FIG. 5, the policy modeling system 106 can identify a training policy (π) 502 (hereinafter "training policy 502") including a distribution of item lists 506a-b and content item ratios 504 corresponding to a frequency in which corresponding item lists 506a-b are selected and presented in accordance with the training policy 502. Similar to one or more embodiments described above, the policy modeling system 106 can receive or estimate the training policy 502 including the distribution of item lists 516a-c and corresponding content item ratios 504. As illustrated in FIG. 5, the training policy 502 includes a first item list 506a including digital content items "1-2" that appear in one-third of item lists selected in accordance with the training policy 502, a second item list 506b including digital content items "2-1" that appear in one-third of item lists selected in accordance with the training policy 502, and a third item list 506c including digital content items "1-3" that appear in one-third of item lists selected in accordance with the training policy 502.

As shown in FIG. 5, the policy modeling system 106 can identify training item-level selection probabilities 508 corresponding to rates at which individual digital content items appear within the item lists 506a-c and at corresponding positions A-B of the item lists 506a-b. For example, as shown in the training item-level selection probabilities 508, digital content item "1" at position "A" corresponds to an item-level selection probability value of "2/3" based on a determination that digital content item "1" appears at position "A" within the item lists 506a-b two-thirds of the time. The training item-level selection probabilities 508 additionally shows that the digital content item "2" at position "A" corresponds to an item-level selection probability value of "1/3," the digital content item "2" at position "B" corresponds to an item-level selection probability value of "1/3," the digital content item "1" at position "B" corresponds to an item-level selection probability value of "1/3," and the digital content item "3" at position "B" corresponds to an item-level selection probability value of "1/3."

As further shown in FIG. 5, the policy modeling system 106 can identify target policy (h) 510 (hereinafter "target policy 510") including a distribution of item lists 514a-b and content item ratios 512 corresponding a frequency in which corresponding item lists 514a-b are selected and presented in accordance with the target policy 510. In particular, the target policy 510 includes a first item list 514a including digital content items "1-2" that appear in one-half of item lists selected in accordance with the target policy 510 and a second item list 514b including digital content items "2-1" that appear in one-half of item lists selected in accordance with the target policy 510. As further indicated in the target policy 510, a third item-list 514c including digital content items "1-3" does not appear in any item lists selected in accordance with the target policy 510.

Similar to the training item-level selection probabilities 508 for the training policy 502, the policy modeling system 106 can identify item-level selection probabilities 516 corresponding to rates at which individual digital content items appear and at what position within the item lists 514a-c of the target policy 510. For example, digital content item "1" at position "A" corresponds to an item-level selection probability value of "1/2" based on a determination that digital content item "1" appears at position "A" within the item lists 514a-c one-half of the time (i.e., within the target policy 510). The item-level selection probabilities 516 additionally show that digital content item "2" at position "A" corresponds to an item-level selection probability value of "1/2," digital content item "1" at position "B" corresponds to an item-level selection probability value of "1/2," and digital content item "2" at position "B" corresponds to an item-level selection probability value of "1/2." The item-level distribution 516 additionally indicates that all other digital content items at corresponding positions have an item-level selection probability value of "0" indicating that no other item-position pairs exist within the target policy 510.

The policy modeling system 106 can detect, collect, or otherwise receive tracked interactions with respect to item lists selected and presented to training users in accordance with the training policy 502. For example, FIG. 5 illustrates a logged dataset including presented item lists 518a-f corresponding to the item lists 506a-c from the target policy 502. In particular, as shown in FIG. 5, the logged dataset includes a first presented item list 518a in which digital content items "1-2" were presented and digital content item "1" was clicked. The logged dataset further includes additional presented item lists 418b-f and associated interactions.

As further shown in FIG. 5, the policy modeling system 106 can decompose the presented item lists 518a-f and compile a record of clicks 520 with respect to the digital content items and positions. In particular, the table shown in FIG. 5 includes an indication of each click with respect to the digital content items presented within the presented item lists 518a-f. In the illustrated example, the clicks 520 correspond to specific digital content items and corresponding positions within the presented item lists 518a-f.

Similar to one or more embodiments described above, the policy modeling system 106 can determine item-level importance weights 522 between the target policy 510 and the training policy 502. In particular, the policy modeling system 106 determines item-level importance weights between similar digital content items at corresponding positions by determining a ratio between target item-level selection probability values 516 for the target policy and corresponding training item-level selection probabilities 508 for the training policy 502 (denoted by "h/π").

The policy modeling system 106 can apply the item-level importance weights 522 to the tracked clicks 520 to determine item-level adjusted user interaction scores 524 for item-position pairs from the logged dataset of presented item lists 518a-f. For example, similar to one or more embodiments described above in connection with FIG. 4, the policy modeling system 106 can determine item-level adjusted interaction scores for each of the presented item lists 418a-f shown in FIG. 5.

In addition, the policy modeling system 106 can determine total adjusted user interaction scores 526 based on the item-level adjusted user interaction scores 524. For example, the policy modeling system 106 can sum or otherwise combine item-level adjusted user interaction scores 524 for each of the presented item lists 518a-f to determine a composite or total adjusted user interaction score for each of the presented item lists 518a-f. As shown in FIG. 5, where a single digital content item from a presented item list is clicked, the total adjusted user interaction score is equal to the item-level adjusted user interaction score for the clicked digital content item. Alternatively, where both of the digital content items from the presented list are clicked, the total adjusted user interaction score is equal to the sum of the item-level adjusted user interaction scores for the clicked digital content items.

The policy modeling system 106 can apply a clipping threshold (M) 528 (hereinafter "clipping threshold 528") to one or more of the item-level importance weights 522, and/or adjusted user interaction scores 524, 526 (i.e., similar to the example shown above in connection with FIG. 4). For example, in the example shown in FIG. 5, the policy modeling system 106 can set the clipping threshold to M=4, indicating that any of the item-level adjustment weights that exceed a value of "4" should be replaced with the clipping threshold 528. The policy modeling system 106 can alternatively apply the clipping threshold to the item-level adjusted interaction scores (and/or the total adjusted interaction scores).

As further shown, the policy modeling system 106 can determine a performance value 530 based on the adjusted user interaction scores (i.e., a probability of user interaction with a digital content item from an item list selected and presented in accordance with the target policy 510). In particular, in the example shown in FIG. 5, the policy modeling system 106 determines a total performance value of "33/4" based on a sum of the item-level adjusted user interaction scores 526. In addition, the policy modeling system 106 determines an average performance value of "11/8" based on an average of the list-level adjusted user interaction scores 526.

Furthermore, although FIGS. 3-5 include specific examples for training an item-level importance sampling model, the policy modeling system 106 can perform a variety of alternative embodiments. For example, while FIGS. 3-5 illustrate training data and training policies that include two or three possible digital content items in an item lists the policy modeling system 106 can utilize training policies (and target policies) with item lists comprising a variety of different digital content items (e.g., ten digital content items). Moreover, the digital content items in training item lists need not match the digital content items in target item lists.

Similarly, although FIGS. 3-5 illustrate various distributions and ratios for a digital content campaign, the policy modeling system 106 can utilize any variety of distributions or ratios for training policies or target policies. Moreover, although FIGS. 3-5 illustrate training data that includes affirmative selections matching the ratios of training policies, the policy modeling system 106 can operate with some samples that do not include user interactions. Moreover, the number and type of training data samples may not match the ratio of training policies.

The policy modeling system 106 can also be described in terms of algorithms and/or pseudocode for performing certain functions by a computing device. For example, consider a ground set of items:

$$E = \{1, \ldots, |E|\} \tag{1}$$

where items (E) refer to digital content items such as web pages, images, videos, or other presented digital content items that are presented to users in item lists of length K. Considering the length K of a distribution of lists, consider a number of K-permutations of the ground set E to be:

$$\Pi_K(E) = \{(a_1, \ldots, a_K) : a_1, \ldots, a_K \in E; a_i \neq a_j \text{ for any } i \neq j\} \tag{2}$$

In addition, let X refer to a set of contexts including a number of contexts, each context (x) referring to a feature vector within set X, which the policy modeling system 106 can use to generate an item list (e.g., in response to a user request from a client device).

For further aid in the discussion that follows, consider a policy ($\pi$) (e.g., a training policy) as a conditional probability distribution over lists conditioned on contexts. At time (t), an environment draws a context ($x_t$) and click realizations $w_t \sim D(\cdot | x_t)$ where $D(\cdot | x_t)$ refers to a conditional probability distribution over clicks conditioned on contexts. Based on the policy, the policy modeling system 106 observes $x_t$ and chooses list $A_t = (a_1^t, \ldots, a_K^t) \in \Pi_K(E)$ where $a_k^t$ refers to an item at position (k) at time (t). Further, a reward (e.g., user interaction) of a list can be defined as:

$$f(A, w) = \sum_{k=1}^{K} w(a_k, k) \tag{3}$$

Given the reward of a given list, an expected reward of list (A) at context (x) can be defined as:

$$\mathbb{E}_{w \sim D(\cdot | x)}[f(A, w)] = f(A, \overline{w}(\cdot | x)) \tag{4}$$

Accordingly, a value of a policy (h) can be defined as:

$$V(h) = \mathbb{E}_x[\mathbb{E}_{A \sim h(\cdot | x), w \sim D(\cdot | x)}[f(A, w)]] \tag{5}$$

$$= \mathbb{E}_x[\mathbb{E}_{A \sim h(\cdot | x)} f(A, w(\cdot | x))]$$

where $x_t$, $A_t$, and $w_t$ come from a logged dataset based on tracked interactions with respect to digital content items presented in accordance with the training policy ($\pi$).

As mentioned above, the policy modeling system 106 can train item-level models in accordance with a number of assumptions and constraints. As a first example similar to one or more embodiments described above in connection with the content-based importance sampling model and in accordance with principles and features illustrated in FIG. 4, the policy modeling system 106 can train a document-based click model (e.g., an example embodiment of a content-based importance sampling model) where a click probability is independent of position, that is:

$$\overline{w}(a, k | x) = \overline{w}(a, k' | x) \tag{6}$$

for any a, k, k', and x. Accordingly, the policy modeling system 106 assumes no position bias, and that a user clicks on an item from a given list only based on an individual relevance or attraction of the item to the user. Accordingly, given that a probability that item (a) is displayed by the policy ($\pi$) in context (x) is equal to the following:

$$\pi(a | x) = \sum_{A \in \Pi_K(E): a \in A} \pi(A | x) \tag{7}$$

then an expected reward of policy (h) can be defined as:

$$V(h) = \mathbb{E}_x[\mathbb{E}_{a \sim h(\cdot | x), w \sim D(\cdot | x)}[f(A, w)]] \tag{8}$$

$$\mathbb{E}_x\left[\sum_{a \in E} \overline{w}(a | x) h(a | x)\right]$$

$$\mathbb{E}_x\left[\mathbb{E}_{A \sim \pi(\cdot | X), w \sim D(\cdot | X)}\left[\sum_{k=1}^{K} w(a_k, k) \frac{h(a_k | x)}{\hat{\pi}(a_k | x)}\right]\right]$$

Therefore, for any logging policy (e.g., estimated logging policy ($\hat{\pi}$)), logged dataset ($S = \{(x_t, A_t, w_t)\}_{t=1}^n$), and clipping threshold M>0, the item estimator (e.g., importance sampling model) in this example can be defined as:

$$\hat{V}_I(h) = \frac{1}{|S|} \sum_{(x, A, w) \in S} \sum_{k=1}^{K} w(a_k, k) \min\left\{\frac{h(a_k | x)}{\hat{\pi}(a_k | x)}, M\right\} \tag{9}$$

As another example similar to one or more embodiments described above consistent with many features of the item-position importance sampling model discussed in connection with FIG. 5, the policy modeling system 106 can assume that the probability of clicking on an item (a) at position (k) depends only on the item and corresponding position within an item list. Under this assumption, assume that the probability that an item (a) being displayed at position (k) by policy ($\pi$) in context (x) is equal to the following:

$$\pi(a, k | x) = \sum_{A \in \Pi_K(E): a_k = a} \pi(A | x) \tag{10}$$

In addition, relying on the assumption that $\overline{w}(a, k | x)$ only depends on content of item (a) and position (k), but does not depend on other items and positions within corresponding lists, an expected value of policy (h) can be defined as:

$$V(h) = \mathbb{E}_x[\mathbb{E}_{A \sim h(\cdot|X), w \sim D(\cdot|X)}[f(A, w)]] \quad (11)$$

$$= \mathbb{E}_x\left[\mathbb{E}_{A \sim h(\cdot|X)}\left[\sum_{k=1}^{K} \overline{w}(a_k k \mid x)\right]\right]$$

$$= \mathbb{E}_x\left[\sum_A h(A \mid x) \sum_{k=1}^{K} \sum_{a \in E} \overline{w}(a, k \mid x) \mathbb{1}\{a_k = a\}\right]$$

$$= \mathbb{E}_x\left[\sum_{k=1}^{K} \sum_{a \in E} \overline{w}(a, k \mid x) \sum_A h(A \mid x) \mathbb{1}\{a_k = a\}\right]$$

$$= \mathbb{E}_x\left[\sum_{k=1}^{K} \sum_{a \in E} \overline{w}(a, k \mid x) h(a, k \mid x)\right]$$

$$= \mathbb{E}_x\left[\mathbb{E}_{A \sim \pi(\cdot|X), w \sim D(\cdot|X)}\left[\sum_{k=1}^{K} w(a_K, k) \frac{h(a_K, k \mid x)}{\pi(a_K, k \mid x)}\right]\right]$$

Therefore, for any logging policy (e.g., estimated logging policy ($\hat{\pi}$)), logged dataset (S={$(x_t, A_t, w_t)\}_{t=1}^n$), and clipping threshold M>0, the item estimator in this example can be defined as:

$$\hat{V}_{IP}(h) = \frac{1}{|S|} \sum_{(x,A,w) \in S} \sum_{k=1}^{K} w(a_k, k) \min\left\{\frac{h(a_k, k \mid x)}{\hat{\pi}(a_k, k \mid x)}, M\right\} \quad (12)$$

As another example that includes many features and functionality consistent with the item-position sampling model discussed above in connection with FIG. 5, the policy modeling system 106 can assume that a probability of clicking on item (a) at position (k) factors as:

$$\overline{w}(a,k|x) = \theta(a|x) p(k|x) \quad (13)$$

where p(k|x) refers to an examination probability of position (k) in context (x) and θ(a|x) refers to a probability of clicking on item (a) after being examined in context (x). As used herein, an "examination probability" may refer to a probability of interaction based on position of a document and which can take previous clicks (e.g., with respect to an item list) into account. For example, an examination probability, while based on a position within an item list, can further depend on clicks with other items at smaller ranks (e.g., at later positions). To illustrate, an examination probability may indicate a probability that a user has seen, viewed, or otherwise examined a presented digital content item (e.g., with or without necessarily clicking or interacting with the presented digital content item) based on a position of the digital content item within an item list and/or based on detected clicks with one or more digital content items presented above or near the digital content item within the item list. An examination probability can be computed in a variety of ways. For example, the policy modeling system 106 can determine an examination probability in accordance with principles described in "Click Models for Web Search" by Chucklin et al., which is incorporated by reference in its entirety.

Accordingly, relying on the assumption that a probability of examining item (a) under policy (π) at context (x) equals:

$$\pi_{PBM}(a \mid x) = \sum_{k=1}^{K} p(k \mid x) \pi(a, k \mid x) \quad (14)$$

an expected value of policy (h) can be defined as:

$$V(h) = \mathbb{E}_x[\mathbb{E}_{A \sim h(\cdot|X), w \sim D(\cdot|X)}[f(A, w)]] \quad (15)$$

$$\mathbb{E}_x\left[\sum_{k=1}^{K} \sum_{a \in E} \overline{w}(a, k \mid x) h(a, k \mid x)\right]$$

$$\mathbb{E}_x\left[\mathbb{E}_{A \sim \pi(\cdot|X), w \sim D(\cdot|X)}\left[\sum_{k=1}^{K} w(a_K, k) \frac{h_{PBM}(a_k \mid x)}{\pi_{PBM}(a_K \mid x)}\right]\right]$$

a policy-based estimator can be defined for any estimated logging policy ($\hat{\pi}$), logged dataset (S={$(x_t, A_t, w_t)\}_{t=1}^n$), and clipping threshold M>0 as:

$$\hat{V}_{PBM}(h) = \frac{1}{|S|} \sum_{(x,A,w) \in S} \sum_{k=1}^{K} w(a_k, k) \min\left\{\frac{h_{PBM}(a_k \mid x)}{\hat{\pi}_{PBM}(a_K \mid x)}, M\right\} \quad (16)$$

Although the foregoing example provides an exemplary embodiment in relation to clicks, the policy modeling system 106 can further extend each of the above estimators $\hat{V}_I(h)$, $\hat{V}_{IP}(h)$, and $\hat{V}_{PBM}(h)$ to any variety of rewards (e.g., performance values). For example, the policy modeling system 106 can extend each of the above estimators to a setting that considers a weighted sum of observed entries for a fixed weight vector. For example, considering a weighted sum:

$$f(A, w) = \sum_{k=1}^{K} \theta_k w(a_k, k) \quad (17)$$

where θ refers to a fixed weight vector θ=(θ$_1$, ..., θ$_k$)∈$\mathbb{R}_+^K$, and further considering a special case of:

$$\theta = \left(\frac{1}{\log_2(1 + k)}\right)_{k=1}^{K} \quad (18)$$

corresponding to a discounted cumulative gain (DSG). In particular, the policy modeling system 106 can further consider performance values associated with the tracked number of clicks including purchases, downloads, or other metrics associated with a performance value for a target policy. Accordingly, considering the weighted sum and fixed weight vector, the above estimators $\hat{V}_I(h)$, $\hat{V}_{IP}(h)$, and $\hat{V}_{PBM}(h)$ can be extended to a setting in which $\overline{w}(a, k|x)$ is replaced by $\theta_k \overline{w}(a, k|x)$. In accordance with the derivations described above in connection with Equations 9, 12, and 16, the policy modeling system 106 can train item-level importance sampling models by training the following estimators:

$$\hat{V}_{IP}(h) = \frac{1}{|S|} \sum_{(x,A,w) \in S} \sum_{k=1}^{K} \theta_k w(a_k, k) \min\left\{\frac{h(a_k, k \mid x)}{\hat{\pi}(a_k, k \mid x)}, M\right\} \quad (19)$$

$$\hat{V}_I(h) = \frac{1}{|S|} \sum_{(x,A,w) \in S} \sum_{k=1}^{K} \theta_k w(a_k, k) \min\left\{\frac{h_\theta(a_k \mid x)}{\hat{\pi}_\theta(a_k \mid x)}, M\right\} \quad (20)$$

-continued $$\hat{V}_{PBM}(h) = \frac{1}{|S|} \sum_{(x,A,w) \in S} \sum_{k=1}^{K} \theta_k w(a_k, k) \min\left\{\frac{h_{PBM,\theta}(a_k \mid x)}{\hat{\pi}_{PBM,\theta}(a_k \mid x)}, M\right\} \quad (21)$$

where the following probabilities are defined for any policy ($\pi$):

$$\pi_\theta(a \mid x) = \sum_{k=1}^{K} \theta_k \pi(a, k \mid x) \quad (22)$$

$$\pi_{PBM,\theta}(a \mid x) = \sum_{k=1}^{K} \theta_k p(k \mid x) \pi(a, k \mid x) \quad (23)$$

The foregoing acts and algorithms described in relation to FIGS. 3-5 can comprise a corresponding structure for a step for utilizing an item-level importance sampling model to determine a performance value that indicates a probability that one or more target users will interact with one or more items from a target item list selected in accordance with a target digital content selection policy. For example, in one or more embodiments, the acts 320-326 comprise a structure for a step for utilizing an item-level importance sampling model to determine a probability that a target user will interact with one or more items from a target item list selected in accordance with a target digital content selection policy. As another example, in one or more embodiments, acts determining item-level importance weights, determining item-level selection probabilities, and determining an estimated target policy value as described above in connection with FIG. 4 comprises a structure for a step for utilizing an item-level importance sampling model to determine a probability that a target user will interact with one or more items from a target item list selected in accordance with a target digital content selection policy. As another example, in one or more embodiments, acts of determining item-level importance weights, determining item-level selection probabilities, and determining an estimated target policy value as described above in connection with FIG. 5 comprises a structure for a step for utilizing an item-level importance sampling model to determine a probability that a target user will interact with one or more items from a target item list selected in accordance with a target digital content selection policy.

As mentioned above, the policy modeling system 106 can utilize item-level importance sampling models to select and execute a digital content selection policy. For example, FIG. 6 illustrates acts 602-614b of training and utilizing an item-level importance sampling model to select and execute digital content selection policies in accordance with one or more embodiments.

Figure 6:
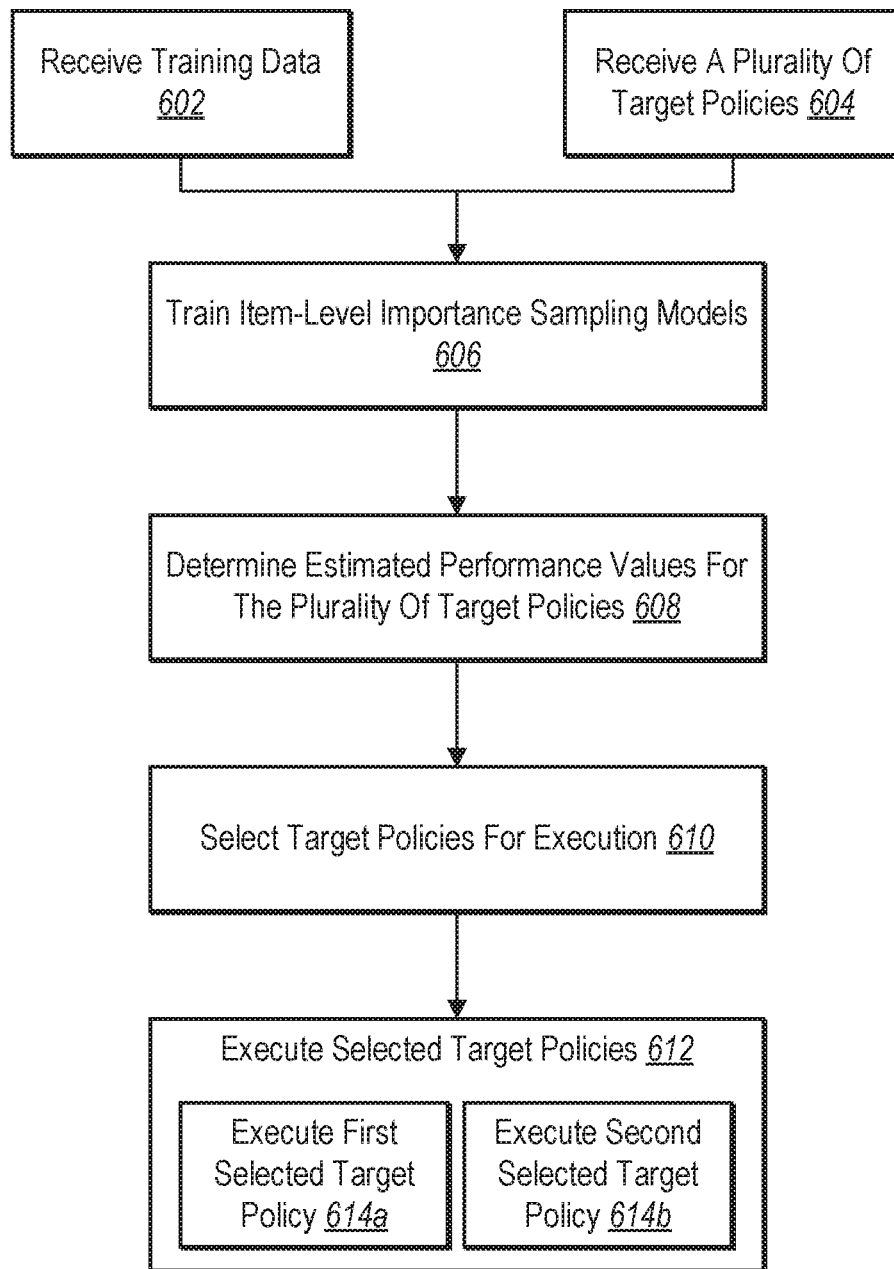
FIG. 6 illustrates implementing an item-level importance sampling model in accordance with one or more embodiments.

In particular, as illustrated in FIG. 6, the policy modeling system 106 performs the act 602 of receiving training data. For example, as described above, the policy modeling system 106 can receive a training policy and digital user interactions with item lists presented to a plurality of training users in accordance with the training policy or estimates the training policy based on tracked interactions by training users.

As further shown, the policy modeling system 106 performs the act 604 of receiving a plurality of target policies. The policy modeling system 106 can receive any number of training policies associated with different distributions of item lists. In one or more embodiments, the received training policies include variations on existing training policies that have been implemented or are currently being implemented in selecting and presenting digital content items to end-users.

As further shown in FIG. 6, the policy modeling system 106 performs the act 606 of training item-level importance sampling models based on the received training data and plurality of target polices. Indeed, the policy modeling system 106 can train an item-level importance sampling model for each of the received target policies (e.g., as discussed with respect to FIGS. 3-5). For example, the policy modeling system 106 can train one or more item-level importance sampling models. Similarly, the policy modeling system 106 can train one or more item-level importance sampling models.

In one or more embodiments, the policy modeling system 106 trains a combination of different types or models of item-level importance sampling models for the plurality of training policies. Indeed, in one or more embodiments, the policy modeling system 106 trains multiple item-level importance sampling models for respective target policies and combines the estimated probabilities to determine an overall value for corresponding target policies.

As shown in FIG. 6, the policy modeling system 106 performs the act 608 of determining estimated performance values for the target policies. In particular, the policy modeling system 106 can utilize the trained item-level importance sampling models to determine a performance value indicating a probability that a given user will interact with an item list presented in accordance with the training policies. In one or more embodiments, the policy modeling system 106 determines a performance value by applying the item-level importance sampling model to a target policy to output probabilities that target users will interact with item lists presented in accordance with the target policy. For example, the policy modeling system 106 can determine an estimated performance value by summing adjusted scores for each interaction from the training data. Alternatively, in one or more embodiments, the policy modeling system 106 determines the estimated policy value by averaging adjusted scores for the interactions from the training data.

Based on the estimated policy values for the target polices, the policy modeling system 106 can additionally perform an act 610 for selecting one or more target policies for execution. In particular, as shown in FIG. 6, the policy modeling system 106 selects a first target policy and a second target policy to execute based on the estimated policy values. In one or more embodiments, the policy modeling system 106 identifies the target policies having the highest performance values generated by the item-level importance sampling models.

The policy modeling system 106 can execute target policies in a variety of ways. For example, the policy modeling system 106 can execute a target policy by implementing the target policy online and providing item lists to client devices of end-users in accordance with the target policy. As another example, the policy modeling system 106 can execute the target policies by conducting an online test of the one or more selected target policies to further verify the estimated performance values determined by the trained item-level importance sampling model(s).

In one or more embodiments, the policy modeling system 106 performs the acts 614a-b of executing 614a-b a first selected target policy and a second selected target policy. For example, upon selecting a first and second target policy, the policy modeling system 106 conducts an online A/B hypothesis test between the first and second target policies to verify which of the first and second target policies are more effective in selecting and presenting item lists in an online environment.

Performing offline evaluation of target policies by training item-level importance sampling model(s) and selectively executing target policies in accordance with FIG. 6 has a number of benefits. For example, by performing offline evaluation of target policies, the policy modeling system 106 can effectively and efficiently evaluate target policies while minimizing a number of end-users having a potentially negative experience (that often occurs when performing online A/B hypothesis testing on unknown target policies). In addition, by training item-level importance sampling models, the policy modeling system 106 can additionally estimate policy values for any number of target policies while consuming significantly less processing resources as conventional methods. In this way, the policy modeling system 106 avoids unnecessary expenses associated with performing online A/B hypothesis testing on a higher number of target policies by first evaluating target policies and more selectively executing those target policies predicted to yield higher success in an online environment.

Moreover, training item-level importance sampling models in accordance with one or more embodiments described herein produce more accurate estimations having less bias and variability than list-level estimators. In fact, the reduction of bias can be proven. For example, given a list-level model that predicts a value of policy (h) as the following:

$$\hat{V}_L(h) = \frac{1}{|S|} \sum_{(x,A,w) \in S} f(A, w) \min\left\{\frac{h(A|x)}{\hat{\pi}(A|x)}, M\right\} \quad (24)$$

and for any clipping threshold M>0, consider a subset of policies in which a list-level estimated value is unbiased:

$$H_L = \{h \in H : h(A|x)/\pi(A|x) \leq M \text{ for all } A, x\} \quad (25)$$

In contrast, consider the following estimated value of a subset of policies in which an item-level (e.g., $\hat{V}_{IP}(h)$) is unbiased:

$$H_{IP} = \{h \in H : h(a,k|x)/\pi(a,k|x) \leq M \text{ for all } a,k,x\} \quad (26)$$

Based on $H_L$ and $H_{IP}$ above, it can be concluded that $H_L \subseteq H_{IP}$. Further, by fixing $Y \in \{I, IP, PBM\}$, and considering $H_Y \subseteq H$ be the subset in which $V_Y$ is unbiased, the same line of reasoning leads to $H_L \subseteq H_{IP} \subseteq H_Y$, thereby demonstrating that the item-level estimator generates unbiased results for a larger subset than list-level estimators.

Along similar lines, the policy modeling system 106 trains item-level importance sampling models that estimate performance values closer to the value of evaluation policies than list-level estimators. For example, for any clipping threshold (M)>0 and policy (h), and given the following proposition:

$$\mathbb{E}_S[\hat{V}_L(h)] \leq \mathbb{E}_S[\hat{V}_{IP}(h)] \leq V(h) \quad (27)$$

it is noted that estimated values for $\hat{V}_L(h)$ and $\hat{V}_{IP}(h)$ can be expressed using the following equations:

$$\mathbb{E}_S[\hat{V}_L(h)] = \mathbb{E}_x\left[\sum_{a \in E} \sum_{k=1}^{K} \overline{w}(a,k|x) \sum_{A:a_k=a} \min\{h(A|x), M\pi(A|x)\}\right] \quad (28)$$

$$\mathbb{E}_S[\hat{V}_{IP}(h)] = \mathbb{E}_x\left[\sum_{a \in E} \sum_{k=1}^{K} \overline{w}(a,k|x) \min\{h(a,k|x), M\pi(a,k|x)\}\right] \quad (29)$$

According, $\mathbb{E}_S[\hat{V}_L(h)] \leq \mathbb{E}_S[\hat{V}_{IP}(h)]$ from Equation 27 above can be proven by showing that $$\sum_{A:a_k=a} \min\{h(A|x), M\pi(A|x)\} \leq \min\{h(a,k|x), M\pi(a,k|x)\} \quad (30)$$

holds for any a, k, and x. Based on the above equalities, it follows that:

$$h(a,k|x) = \sum_{A:a_k=a} h(A|x) \geq \sum_{A:a_k=a} \min\{h(A|x), M\pi(A|x)\} \quad (31)$$

and $$M\pi(a,k|x) = \sum_{A:a_k=a} M\pi(A|x) \geq \sum_{A:a_k=a} \min\{h(A|x), M\pi(A|x)\} \quad (32)$$

Therefore, both the estimators $\hat{V}_I(h)$, $\hat{V}_{PBM}(h)$ generate estimations having less bias and more accuracy than the list level estimator $\hat{V}_L(h)$.

Using similar logic as the proposition above ($\mathbb{E}_S[\hat{V}_L(h)] \leq \mathbb{E}_S[\hat{V}_{IP}(h)] \leq V(h)$, the following propositions can be proven:

$$\mathbb{E}_S[\hat{V}_L(h)] \leq \mathbb{E}_S[\hat{V}_{IP}(h)] \leq \mathbb{E}_S[\hat{V}_I(h)] \leq V(h) \quad (33)$$

$$\mathbb{E}_S[\hat{V}_L(h)] \leq \mathbb{E}_S[\hat{V}_{IP}(h)] \leq \mathbb{E}_S[\hat{V}_{PBM}(h)] \leq V(h) \quad (34)$$

thereby demonstrating that the item-level models trained by the policy modeling system 106 herein are less biased the list-level estimator $\hat{V}_L(h)$ from Equation 24.

Furthermore, in one or more embodiments, the policy modeling system 106 trains and utilizes the item-level importance sampling models to more effectively optimize content-item selection policies. For example, given:

$$\tilde{h}_L = \text{argmax}_{h \in H} \hat{V}_L(h) \quad (35)$$

where $\tilde{h}_L$ refers to the best policy according to a list-level estimator $\hat{V}_L(h)$, the value ($\hat{V}_L(\tilde{h}_L)$) is bounded by the value of an optimal policy as follows. Given:

$$h_L^* = \text{argmax}_{h \in H} \hat{V}_L(h) \quad (36)$$

where $\tilde{h}_L^*$ is the best policy in a subset of policies, then:

$$V(\tilde{h}_L) \geq V(h_L^*) - M\mathbb{E}_x[F_L(x|\tilde{h}_L)] - M\mathbb{E}_x[F_L(x|h_L^*)] - 2K\sqrt{\frac{\ln\left(\frac{4}{\delta}\right)}{2|S|}} \quad (37)$$

with a probability of at least 1-δ, where:

$$F_L(x|h) = \sum_A \mathbb{1}\left\{\frac{h(a|x)}{\pi(a|x)} \leq M\right\} f(A, \overline{w}(\cdot|x))\Delta(A|x) \quad (38)$$

where $\Delta(A|x) = |\hat{\pi}(A|x) - \pi(A|x)|$ refers to error in the item-level estimate of $\pi(A|x)$ in context (x).

The above bounding of $\hat{V}_L(\tilde{h}_L)$ (See Equation 37) includes three error terms, two expectations over (x) and one $\sqrt{\log 1/\delta}$ term. The $\sqrt{\log 1/\delta}$ is due to randomness in generating the logged dataset. The two expectations are bias due to estimating the logging policy. When the logging policy is known, both terms vanish, and the bound reduces to:

$$V(\tilde{h}_L) \geq V(\tilde{h}_L^*) - 2K\sqrt{\frac{\ln\left(\frac{4}{\delta}\right)}{2|S|}} \quad (39)$$

with the $\sqrt{\log 1/\delta}$ error term vanishing as the size of the logged dataset increases. Similar guarantees can be obtained for each of the different types of item-level importance sampling models described herein.

In proving the above assertions, consider:

$$\mathbb{E}_S[\hat{V}_L(h)] \leq V(h) + M\mathbb{E}_x[F_L(x|h)]$$

$$\mathbb{E}_S[\hat{V}_L(h)] \geq \mathbb{E}_x[G_L(x|h)] - M\mathbb{E}_x[F_L(x|h)] \quad (40)$$

Where $F_L(x|h)$ is defined above (Equation 38) and:

$$G_L(x|h) = \sum_A \mathbb{1}\left\{\frac{h(A|x)}{\pi(A|x)} \leq M\right\} f(A, \overline{w}(\cdot|x)) h(A|x) \quad (41)$$

Further note that:

$$\mathbb{E}_S[\hat{V}_L(h)] = \mathbb{E}_x\left[\mathbb{E}_{A\sim\pi(\cdot|x)}\left[f(A, \overline{w}(\cdot|x))\min\left\{\frac{h(A|x)}{\hat{\pi}(A|x)}, M\right\}\right]\right] \quad (42)$$

$$= \mathbb{E}_x\left[\sum_A \left[f(A, \overline{w}(\cdot|x))\min\left\{\frac{h(A|x)}{\hat{\pi}(A|x)}, M\right\}\pi(A|x)\right]\right]$$

where main claims can be obtained by bounding $$\min\left\{\frac{h(A|x)}{\hat{\pi}(A|x)}, M\right\}\pi(A|x) \quad (43)$$

from above and below, under the conditions $h(A|x)/\pi(A|x) \leq M$ and $h(A|x)/\pi(A|x) > M$. Let $h(A|x)/\pi(A|x) \leq M$, then:

$$\min\left\{\frac{h(A|x)}{\hat{\pi}(A|x)}, M\right\}\pi(A|x) \leq h(A|x) + M\Delta(A|x), \quad (44)$$

$$\min\left\{\frac{h(A|x)}{\hat{\pi}(A|x)}, M\right\}\pi(A|x) \leq h(A|x) - M\Delta(A|x)$$

In addition, let $h(A|x)/\pi(A|x) > M$, then:

$$0 \leq \min\left\{\frac{h(A|x)}{\hat{\pi}(A|x)}, M\right\}\pi(A|x) \leq h(A|x) \quad (45)$$

Furthermore, when the logging policy is known:

$$\mathbb{E}_x[G_L(x|h)] \leq \mathbb{E}_S[\hat{V}_L(h)] \leq V(h) \quad (46)$$

the above assumptions and proof underestimates the true value of $V(h)$, which is consistent with the intuition that the clipping of the estimator can introduce a downside bias. In addition, where the estimated training policy is equal to the training policy, $\mathbb{E}_S[\hat{V}_L(h)] = V(h)$ for all policies (h) from a set of policies. Equivalently, the list-based estimator is unbiased for any policy (h) that is unaffected by the clipping.

Moreover, considering Hoeffding's inequality and the upper bound of $\mathbb{E}_S[\hat{V}_L(h)]$ (Equation 37) above:

$$\hat{V}_L(\tilde{h}_L) \leq (\tilde{h}_L) + M\mathbb{E}_x[F_L(x|\tilde{h}_L)] + K\sqrt{\frac{\ln\left(\frac{4}{\delta}\right)}{2|S|}} \quad (47)$$

with the probability of at least $1-\delta/2$. Similarly, from Hoeffding's inequality and the lower bound of $\mathbb{E}_S[\hat{V}_L(h)]$ (Equation 37) above:

$$\hat{V}_L(\tilde{h}_L^*) \leq (\tilde{h}_L^*) - M\mathbb{E}_x[F_L(x|\tilde{h}_L^*)] - K\sqrt{\frac{\ln\left(\frac{4}{\delta}\right)}{2|S|}} \quad (48)$$

with the probability of at least $1-\delta/2$. The final result follows from the observation that $\hat{V}_L(\tilde{h}_L) \geq \hat{V}_L(\tilde{h}_L^*)$.

In addition, given an estimated training policy and $M>0$:

$$\mathbb{E}_S[\hat{V}_{IP}(h)] \leq V(h) + M\mathbb{E}_x[F_{IP}(x|h)]$$

$$\mathbb{E}_S[\hat{V}_{IP}(h)] \geq \mathbb{E}_x[G_{IP}(x|h)] - M\mathbb{E}_x[F_{IP}(x|h)] \quad (49)$$

where $F_{IP}(x|h)$ is defined above in Equation 38, and:

$$G_{IP}(x|h) = \sum_{a\in E}\sum_{k=1}^{K} \mathbb{1}\left\{\frac{h(a,k|x)}{\hat{\pi}(a,k|x)} \leq M\right\}\overline{w}(a,k|x)h(a,k|x) \quad (50)$$

In addition, with regard to the inequality of $\mathbb{E}_S[\hat{V}_L(h)]$ described above, a similar proof can be applied with the exception that the used inequalities are:

$$\left|\min\left\{\frac{h(a,k|x)}{\hat{\pi}(a,k|x)}, M\right\}\pi(a,k|x) - h(a,k|x)\right| \leq M\Delta(a,k|x) \quad (51)$$

for $h(a,k|x)/\pi(a,k|x) \leq M$, and $$0 \leq \min\left\{\frac{h(a,k|x)}{\hat{\pi}(a,k|x)}, M\right\}\pi(a,k|x) \leq h(a,k|x) \quad (52)$$

when $h(a,k|x)/\pi(a,k|x) > M$. Further, when the logging policy is known:

$$\mathbb{E}_x[G_{IP}(x|h)] \leq \mathbb{E}_S[\hat{V}_{IP}(h)] \leq V(h) \quad (53)$$

Figure 7:
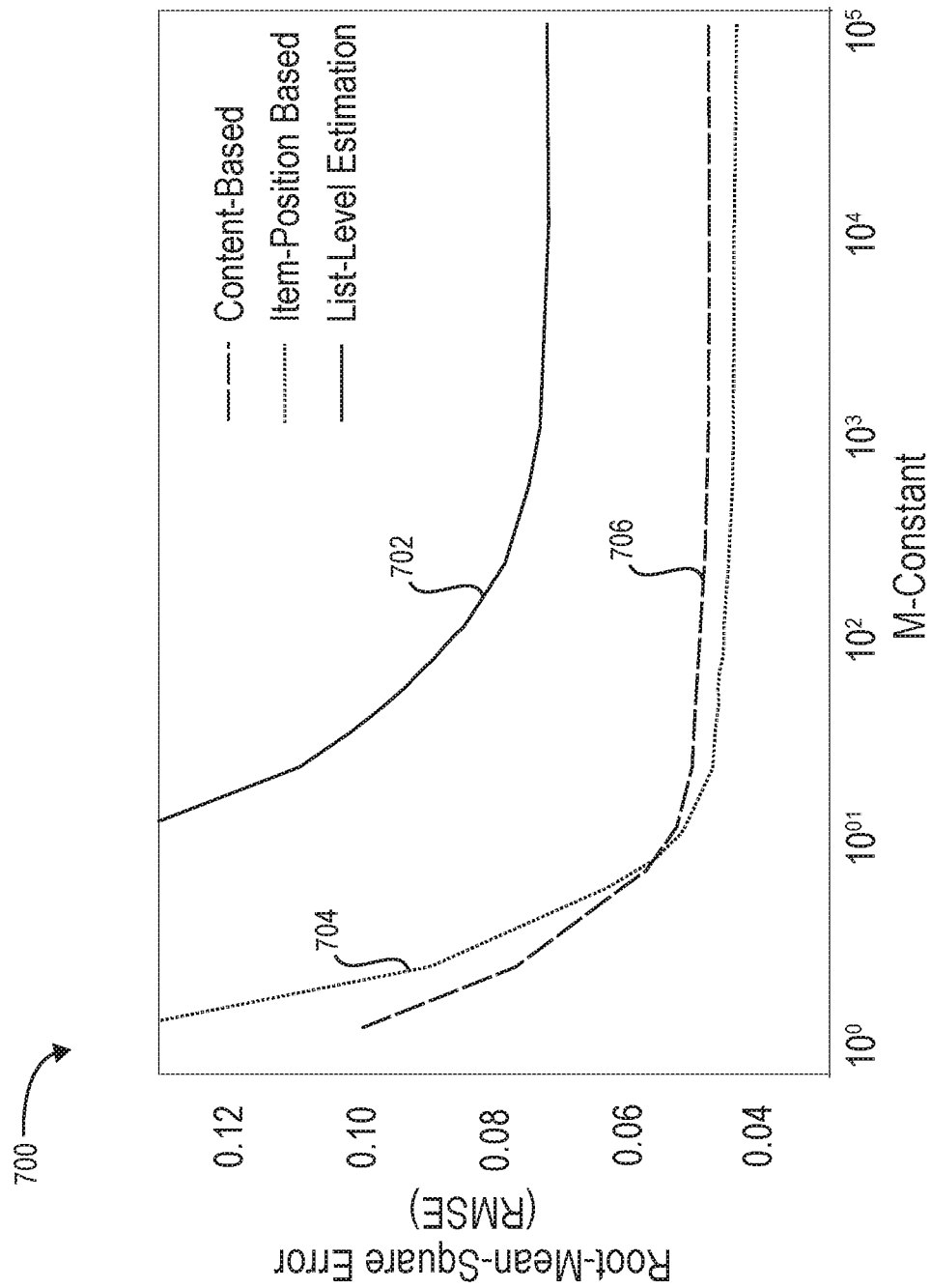
FIG. 7 illustrates a graph showing results of experiments performed utilizing an item-level importance sampling model in accordance with one or more embodiments.

FIG. 7 further illustrates benefits of the policy modeling system 106 in accordance with one or more embodiments. For instance, FIG. 7 illustrates experimental results with respect to a training dataset including approximately 167 million search queries. In particular, the policy modeling system 106 considered the one-hundred most frequent presented item lists in accordance with the training policy and trained the item-level importance sampling models in accordance with one or more embodiments described herein. Similar results were achieved for different experiments that considered more than one hundred queries as well as varying list lengths.

FIG. 7 illustrates a graph 700 including accuracy of the item-level estimators measured as a root mean square error (RMSE) of the predicted performance values across a range of clipping thresholds (M). For example, the graph 700 includes determined RMSE across a range of M-constant values for a list-level estimator 702, an item-position based model 704 similar to the item-position based model similar to one or more embodiments described above in connection with FIG. 4, and an item-position based model 706 described similar to one or more embodiments described above in connection with FIG. 5. As illustrated in FIG. 7, the item-level models provide more accurate estimations than the list-level model.

Figure 8:
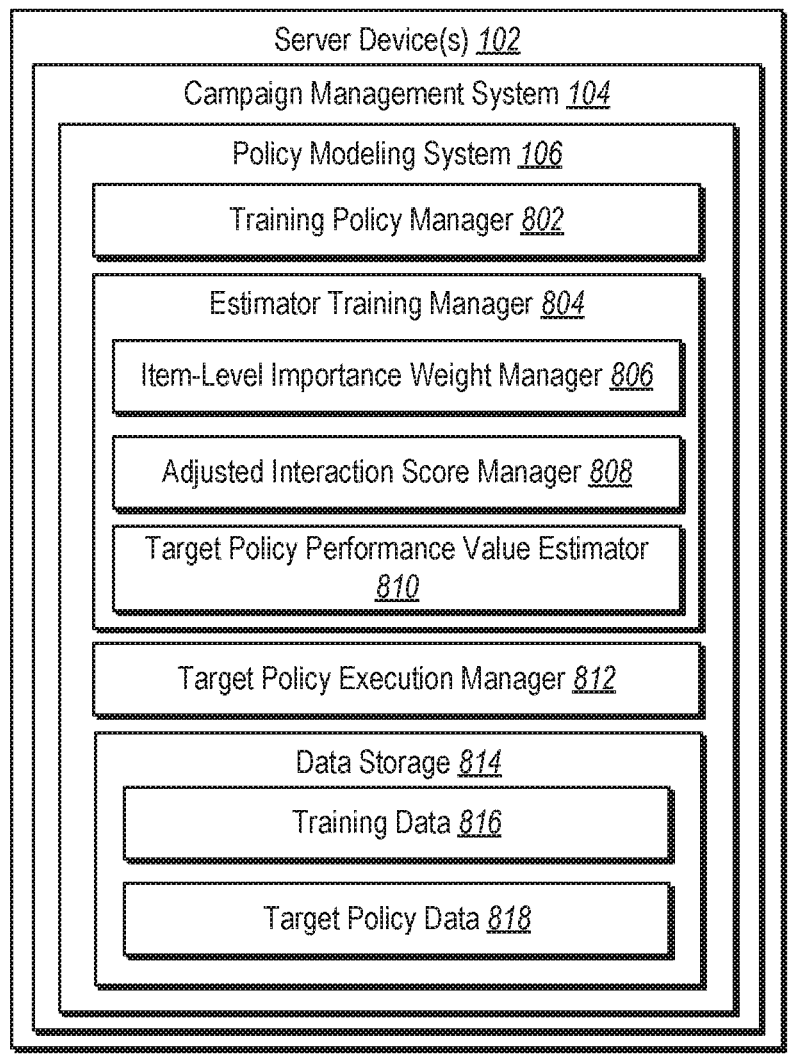
FIG. 8 illustrates a schematic diagram of an example policy modeling system in accordance with one or more embodiments.

Turning now to FIG. 8, additional detail will be provided regarding components and capabilities of an example architecture for the policy modeling system 106. As mentioned above, the policy modeling system 106 may be implemented by a variety of computing devices including the server device(s) 102, training server device(s) 112, or combination of the two. In particular, FIG. 8 illustrates one implementation of the policy modeling system 106 implemented within a campaign management system 104 on the server device(s) 102 and having similar features and functionality associated with one or more embodiments described above. For example, the policy modeling system 106 can provide features and functionality associated with training an item-level importance sampling model to estimate a performance value that indicates a probability that a target user will interact with one or more item lists presented in accordance with a target policy.

As shown in FIG. 8, the policy modeling system 106 includes a training policy manager 802 and an estimator training manager 804. As illustrated in FIG. 8, the estimator training manager 804 includes an item-level importance weight manager 806, an adjusted user interaction score manager 808 and a target policy performance value estimator 810. In addition, the policy modeling system 106 includes a target policy execution manager 812 and data storage 814 including training data 816 and target policy data 818.

In one or more embodiments, each of the components of the policy modeling system 106 are in communication with one another using any suitable communication technologies. Additionally, the components of the policy modeling system 106 can be in communication with one or more other devices including the client devices 108a-n and the testing server device(s) 112, as illustrated in FIG. 1. It will be recognized that although the components of the policy modeling system 106 are shown to be separate in FIG. 8, any of the subcomponents may be combined into fewer components, such as into a single component, or divided into more components as may serve a particular implementation. Furthermore, although the components of FIG. 8 are described in connection with the policy modeling system 106, at least some of the components for performing operations in conjunction with the policy modeling system 106 described herein may be implemented on other devices within the environment.

The components of the policy modeling system 106 can include software, hardware, or both. For example, the components of the policy modeling system 106 can include one or more instructions stored on a computer-readable storage medium and executable by processors of one or more computing devices (e.g., the server device(s)). When executed by the one or more processors, the computer-executable instructions of the policy modeling system 106 can cause the server device(s) 800 to perform the methods described herein. Alternatively, the components of the policy modeling system 106 can comprise hardware, such as a special purpose processing device to perform a certain function or group of functions. Additionally or alternatively, the components of the policy modeling system 106 can include a combination of computer-executable instructions and hardware.

Furthermore, the components of the policy modeling system 106 performing the functions described herein with respect to the policy modeling system 106 may, for example, be implemented as part of a stand-alone application, as a module of an application, as a plug-in for applications including content management applications, as a library function or functions that may be called by other applications, and/or as a cloud-computing model. Thus, the components of the policy modeling system 106 may be implemented as part of a stand-alone application on a personal computing device or a mobile device. Alternatively or additionally, the components of the policy modeling system 106 may be implemented in any application that allows product and customer management, including, but not limited to, applications in ADOBE® ANALYTICS CLOUD, such as ADOBE® ANALYTICS, ADOBE® AUDIENCE MANAGER, ADOBE® CAMPAIGN, ADOBE® EXPERIENCE MANAGER, and ADOBE® TARGET. "ADOBE", "ADOBE ANALYTICS CLOUD", "ADOBE ANALYTICS", "ADOBE AUDIENCE MANAGER", "ADOBE CAMPAIGN", "ADOBE EXPERIENCE MANAGER", and "ADOBE TARGET" are registered trademarks of Adobe Systems Incorporated in the United States and/or other countries.

As shown in FIG. 8, the policy modeling system 106 includes a training policy manager 802. In one or more embodiments, the training policy manager 802 manages collection, monitoring, and/or receipt of training data including a training policy and information about interactions performed by training users with respect to digital content item presented to the training users in accordance with the training policy. In one or more embodiments, the training policy manager 802 receives the training data from the testing server device(s) 112 or other device that observe or otherwise collect training data from client devices. Alternatively, the training policy manager 802 can track interactions by training users directly.

As mentioned in one or more embodiments described above, the training policy manager 802 can identify the training policy in a number of ways. For example, the training policy manager 802 can receive the training policy including an explicit distribution of item lists. Alternatively, in one or more embodiments, the training policy manager 802 estimates the training policy based on information associated with user interactions.

As further shown in FIG. 8, the policy modeling system 106 includes an estimator training manager 804 that trains item-level importance sampling models in accordance with one or more embodiments described herein. For example, as shown in FIG. 8, the estimator training manager 804 includes an item-level importance weight manager 806 that determines item-level importance weights on at an item-level (e.g., content-based and/or position-based) based on the distributions of digital content items of the target policy and training policy. For example, the item-level importance weight manager 806 can determine item-level importance weights for each digital content item based on a difference in frequency that a digital content item appears within the distribution for the target policy and the distribution for the training policy.

As further shown in FIG. 8, the estimator training manager 804 includes an adjusted user interaction score manager 808 that determines adjusted user interaction scores on an interaction-by-interaction level. For example, in one or more embodiments, the adjusted interaction score manager 808 identifies whether a digital content item has been clicked by a training user. The adjusted interaction score manager 808 can apply the item-level importance weight determined for the digital content item to the detected click to determine an adjusted user interaction score corresponding to the detected click (or other interaction).

As shown in FIG. 8, the estimator training manager 804 additionally includes a target policy performance value estimator 810 that determines an estimated performance value for a target policy. For example, the target policy performance value estimator 810 can determine a projected performance value for the target policy based on a combination of the adjusted user interaction scores. For instance, the performance value can include an estimated number of interactions or an average number of interactions per item list corresponding to a target policy that indicate a probability that a target user will interact with an item list selected in accordance with the target policy.

As further illustrated in FIG. 8, the policy modeling system 106 includes a target policy execution manager 812. The target policy execution manager 812 manages execution of one or more target policies based on determined values of the corresponding target policies. For example, upon determining that a target policy satisfies a threshold estimation value or upon determining that the target policy is projected to outperform other target policies, the target policy execution manager 812 can execute the target policy (as part of executing a digital content campaign) by causing the server device(s) 102 or testing server device(s) 112 to implement the target policy online and presenting item lists to computing devices associated with target users.

In one or more embodiments, the target policy execution manager 812 can further identify one or more target policies on which to perform an online A/B hypothesis test. For example, the target policy execution manager 812 can selectively identify two target policies projected to outperform one or more additional target policies and conduct an online A/B hypothesis test (or cause the online testing system 114 on the testing server device(s) 112 to perform an online A/B hypothesis to further determine or verify a projected value of the target policies.

As illustrated in FIG. 8, the policy modeling system 106 includes a data storage 814 including training data 816. As discussed above, the training data 816 can include any information associated with a training policy and interactions with item lists presented in accordance with the training policy. For example, the training data 816 can include a distribution of item lists explicitly defined by the target policy (or an estimated target policy) in accordance with one or more embodiments described herein. In addition, the training data 816 can include interaction information including an identification of digital content item clicked on, downloaded, or otherwise interacted with. The training data 816 can additionally include an identification of positions of digital content items within item lists. In one or more embodiments, the training data 816 additionally includes an order of selected digital content items within item lists. Indeed, the training data 816 can include any information about training users, a training policy, and detected interactions for use in training the item-level importance sampling model as described above.

In addition to the training data 816, the data storage 814 includes target policy data 818. The target policy data 818 includes any information about one or more target policies including distributions of digital content items and associated frequencies in which item lists are projected to appear to target users. The target policy data 818 can include information for any number of policies, thereby enabling the policy modeling system 108 to train item-level importance sampling models to estimate policy values for each of the target policies. Indeed, the target policy data 818 can include any information about the target policies that the training data 816 includes about the training policy.

Figure 9:
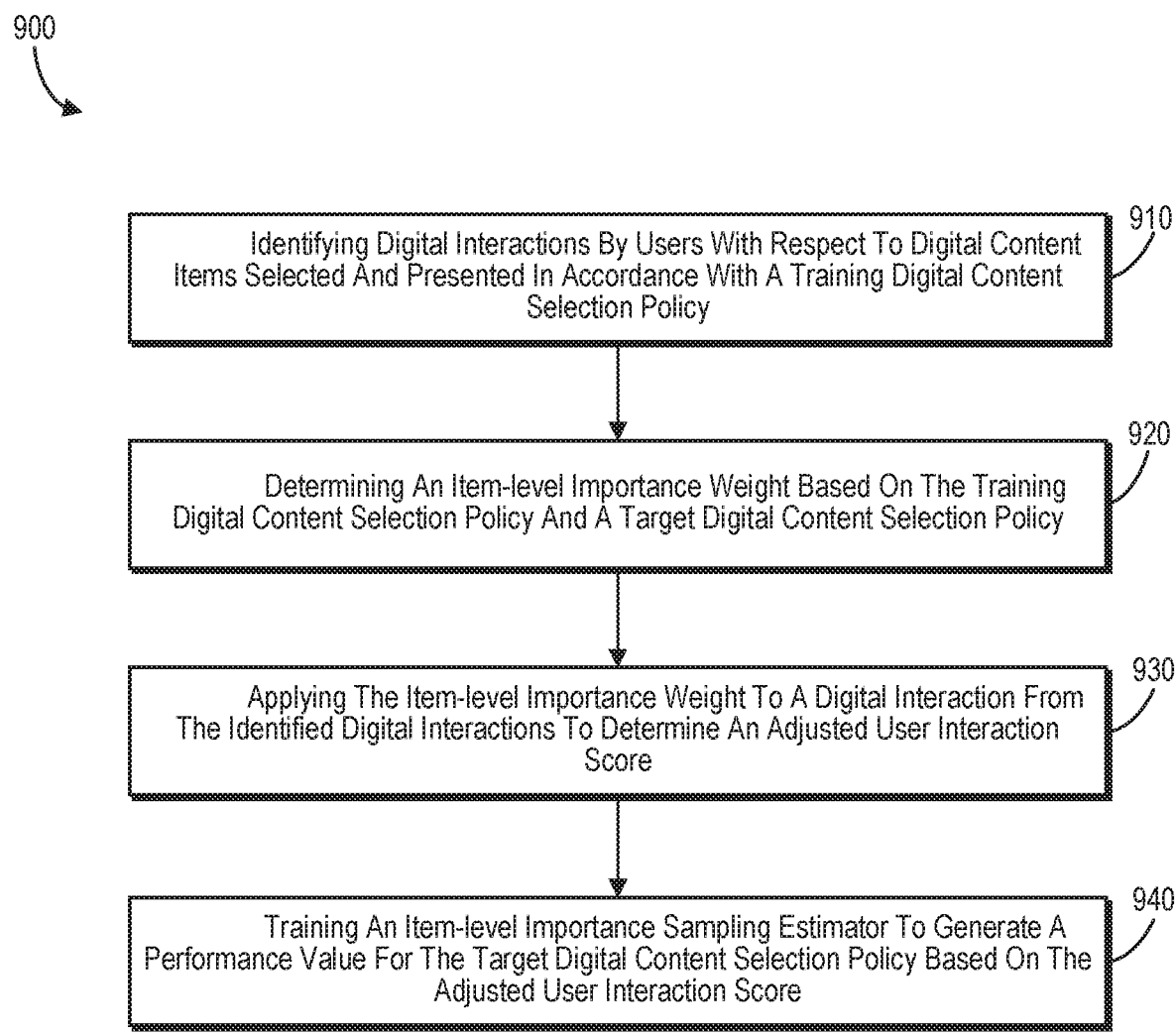
FIG. 9 illustrates a flow diagram of an example series of acts for training and executing an item-level importance sampling model in accordance with one or more embodiments.

Turning now to FIG. 9, this figure illustrates a flowchart including a series of acts 900 of training an item-level importance sampling model to determine a performance value for a target policy. While FIG. 9 illustrates acts according to one or more embodiments, alternative embodiments may omit, add to, reorder, and/or modify any of the acts shown in FIG. 9. The acts of FIG. 9 can be performed as part of a method. Alternatively, a non-transitory computer readable medium can comprise instructions, that when executed by one or more processors, cause a computing device to perform the acts of FIG. 9. In still further embodiments, a system can perform the acts of FIG. 9.

For example, the series of acts 900 includes an act 910 of identifying digital interactions by users (e.g., training users) with respect to digital content items selected and presented in accordance with a training digital content selection policy. For example, in one or more embodiments, the act 910 includes identifying digital interactions by users (e.g., users 110a-n) with respect to digital content items selected and presented as part of training item lists to computing devices (e.g., client devices 108a-n) of the users in accordance with a training digital content selection policy. In one or more embodiments, the series of acts 900 includes estimating the training digital content selection policy based on the training item lists presented to the computing devices of the users.

As further shown in FIG. 9, the series of acts 900 includes an act 920 of determining an item-level importance weight based on the training digital content selection policy and a target digital content selection policy. For example, in one or more embodiments, the act 920 includes determining, for a first digital content item from the digital content items (e.g., the digital content items presented to the users), a first item-level importance weight based on the training digital content selection policy and the target digital content selection policy. In one or more embodiments, determining the first item-level importance weight includes determining a first training item-level selection probability for the first digital content item based on the training digital content selection policy and a first target item-level selection probability for the first digital content item based on the target digital content selection policy. In one or more embodiments, determining the first item-level importance weight further includes determining the first item-level importance weight based on the first training item-level selection probability and the first target item-level selection probability. In one or more embodiments, the training item lists generated in accordance with the training digital content selection policy differ from target item lists generated in accordance with the target digital content selection policy.

In addition, the series of acts 900 includes an act 930 of applying the item-level importance weight to a digital interaction from the identified digital interactions by the users to determine an adjusted user interaction score. For example, in one or more embodiments, the act 930 includes applying the first item-level importance weight to a first interaction from the identified digital interactions by a first computing device of a first user (e.g., a first training user) with the first digital content item from a first item list. to train the item-level importance sampling model.

In one or more embodiments, the series of acts includes determining, for a second digital content item of the digital content items, a second item-level importance weight based on the training digital content selection policy and the target digital content selection policy and applying the second item-level importance weight to a second interaction from the identified digital interactions with a second digital content item from the digital content items. In addition, in one or more embodiments, the series of acts 900 includes comparing the second item-level importance weight to a clipping threshold. In addition, based on the comparison between the second item-level importance weight and the clipping threshold, the series of acts 900 can include applying the clipping threshold to the second interaction with the second digital content item.

Furthermore, the series of acts 900 includes an act 940 of training an item-level importance sampling estimator to generate a performance value for the target digital content selection policy based on the adjusted user interaction score. For example, in one or more embodiments, the act 940 includes training an item-level importance sampling model to predict a performance value indicating a probability that a user (e.g., a target user) will interact with one or more items from a target item list selected in accordance with a target digital content selection policy. In one or more embodiments, training the item-level importance sampling model includes determining item-level importance weight(s) based on the training digital content selection and the target digital content selection policy and further applying the item-level importance weight(s) to one or more interactions from the identified digital interactions by the users.

In one or more embodiments, the series of acts 900 includes training the item-level importance sampling model to predict a second performance value indicating a second probability that the user will interact with one or more items from a second target item list selected in accordance with a second target digital content selection policy. In addition, in one or more embodiments, the series of acts 900 includes comparing the performance value associated with the target digital content selection policy with the second performance value associated with the second target digital content selection policy. In one or more embodiments, the series of acts 900 includes executing the target digital content selection policy based on comparing the performance value associated with the target digital content selection policy with the second performance value associated with the second target digital content selection policy. In one or more embodiments, executing the target digital content selection policy includes conducting an online A/B hypothesis test between the target digital content selection policy and another digital content selection policy.

In one or more embodiments, training the item-level importance sampling model includes training an item-position importance sampling model that generates a performance value indicating a probability of interaction with the first digital content item based on both a position of the first digital content item within the first item list and content of the first digital content item. In addition, in one or more embodiments, training the item-level importance sampling model comprising training a content-based importance sampling model that generates a performance value indicating a probability of interaction with the first digital content item based on content of the digital content item and independent of position of the first digital content item within the first item list.

Moreover, in one or more embodiments, the training digital content selection policy includes a distribution of training item lists in accordance with a plurality of contexts. In one or more embodiments, the series of acts includes training the item-level importance sampling model to predict a probability that a user will interact with one or more items from a target item list selected in accordance with a target digital content selection policy based on a context associated with the user.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
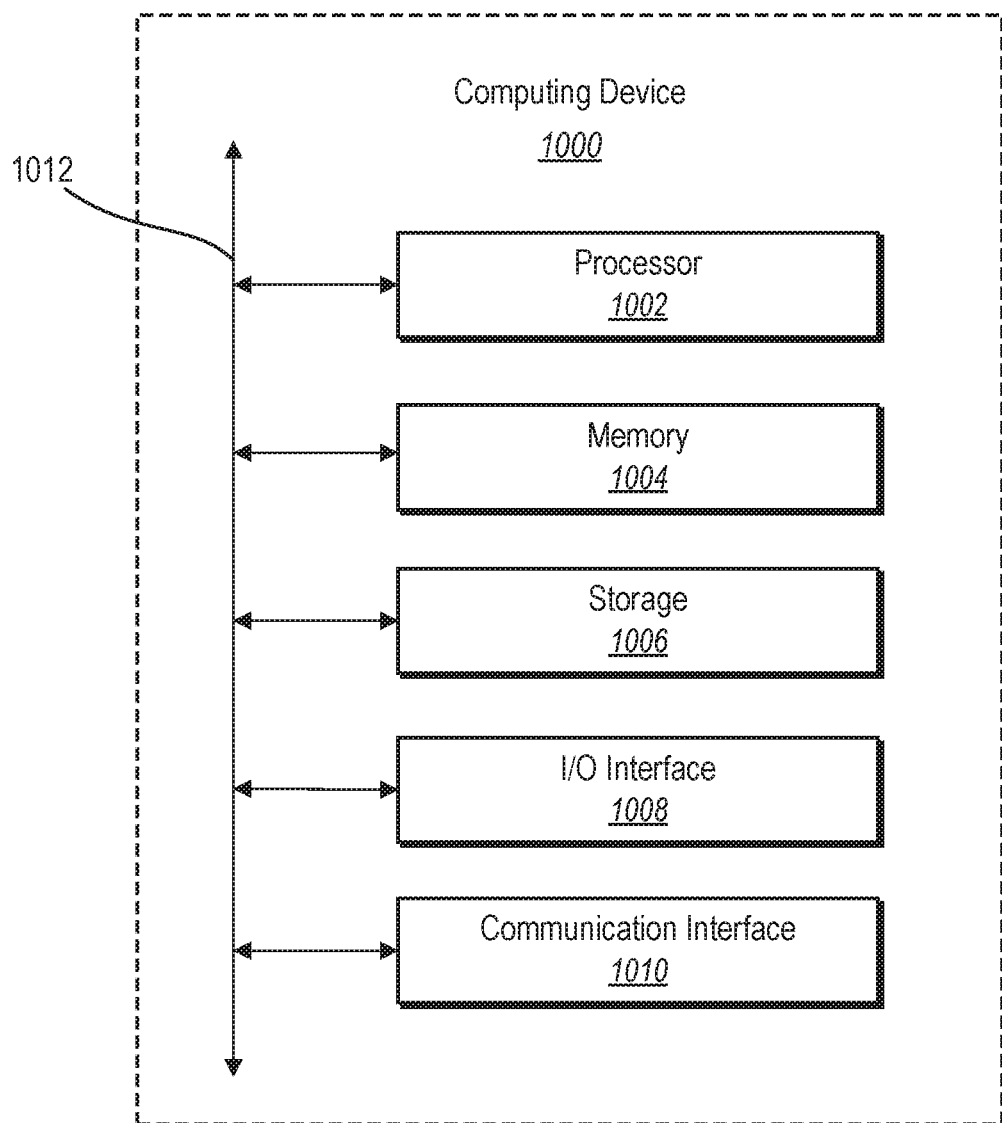
FIG. 10 illustrates a block diagram of an example computing device in accordance with one or more embodiments.

FIG. 10 illustrates a block diagram of exemplary computing device 1000 that may be configured to perform one or more of the processes described above. As shown by FIG. 10, the computing device 1000 can comprise a processor 1002, a memory 1004, a storage device 1006, an I/O interface 1008, and a communication interface 1010, which may be communicatively coupled by way of a communication infrastructure 1012. In certain embodiments, the computing device 1000 can include fewer or more components than those shown in FIG. 10. Components of the computing device 1000 shown in FIG. 10 will now be described in additional detail.

In one or more embodiments, the processor 1002 includes hardware for executing instructions, such as those making up a computer program. As an example and not by way of limitation, to execute instructions for digitizing real-world objects, the processor 1002 may retrieve (or fetch) the instructions from an internal register, an internal cache, the memory 1004, or the storage device 1006 and decode and execute them. The memory 1004 may be a volatile or non-volatile memory used for storing data, metadata, and programs for execution by the processor(s). The storage device 1006 includes storage, such as a hard disk, flash disk drive, or other digital storage device, for storing data or instructions related to object digitizing processes (e.g., digital scans, digital models).

The I/O interface 1008 allows a user to provide input to, receive output from, and otherwise transfer data to and receive data from computing device 1000. The I/O interface 1008 may include a mouse, a keypad or a keyboard, a touch screen, a camera, an optical scanner, network interface, modem, other known I/O devices or a combination of such I/O interfaces. The I/O interface 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1008 is configured to provide graphical data to a display for presentation to a user. The graphical data may be representative of one or more graphical user interfaces and/or any other graphical content as may serve a particular implementation.

The communication interface 1010 can include hardware, software, or both. In any event, the communication interface 1010 can provide one or more interfaces for communication (such as, for example, packet-based communication) between the computing device 1000 and one or more other computing devices or networks. As an example and not by way of limitation, the communication interface 1010 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1010 may facilitate communications with various types of wired or wireless networks. The communication interface 1010 may also facilitate communications using various communication protocols. The communication infrastructure 1012 may also include hardware, software, or both that couples components of the computing device 1000 to each other. For example, the communication interface 1010 may use one or more networks and/or protocols to enable a plurality of computing devices connected by a particular infrastructure to communicate with each other to perform one or more aspects of the digitizing processes described herein. To illustrate, the image compression process can allow a plurality of devices (e.g., server devices for performing image processing tasks of a large number of images) to exchange information using various communication networks and protocols for exchanging information about a selected workflow and image data for a plurality of images.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. In a digital medium environment for selecting and providing digital item lists to client devices in accordance with content selection policies, a computer-implemented method of training a policy model for offline evaluation and execution of a content selection policy, the method comprising:
   identifying digital interactions by users with respect to digital content items, the digital content items selected and presented as part of training item lists to computing devices of the users in accordance with a training digital content selection policy;
   training an item-level importance sampling model to predict a performance value indicating a probability that a user will interact with one or more items from a target item list selected in accordance with a target digital content selection policy by:
      for a first digital content item of the digital content items, determining an item-level importance weight based on the training digital content selection policy and the target digital content selection policy; and
      applying the item-level importance weight to a first interaction from the identified digital interactions by a first computing device of a first user with the first digital content item from a first item list to train the item-level importance sampling model;
   training the item-level importance sampling model to predict a second performance value indicating a second probability that a user will interact with one or more items from a second target item list selected in accordance with a second target digital content selection policy; and
   comparing the performance value associated with the target digital content selection policy with the second performance value associated with the second target digital content selection policy.

2. The method of claim 1, further comprising based on comparing the performance value associated with the target digital content selection policy with the second performance value associated with the second target digital content selection policy, executing the target digital content selection policy by generating and providing an item list to a client device.

3. The method of claim 1, wherein executing the target digital content selection policy comprises conducting an online A/B hypothesis test between the target digital content selection policy and a second target digital content selection policy.

4. The method of claim 1, wherein the training item lists generated in accordance with the training digital content selection policy differ from target item lists generated in accordance with the target digital content selection policy.

5. A non-transitory computer readable medium storing instructions thereon that, when executed by at least one processor, cause a computer system to:
   identify digital interactions by users with respect to digital content items, the digital content items selected and presented as part of training item lists to computing devices of the users in accordance with a training digital content selection policy; and
   train an item-level importance sampling model to predict a performance value indicating a probability that a user will interact with one or more items from a target item list selected in accordance with a target digital content selection policy by:
      for a first digital content item of the digital content items, determining an item-level importance weight based on the training digital content selection policy and the target digital content selection policy; and
      applying the item-level importance weight to a first interaction from the identified digital interactions by a first computing device of a first user with the first digital content item from a first item list to train the item-level importance sampling model;
   train the item-level importance sampling model to predict a second performance value indicating a second probability that a user will interact with one or more items from a second target item list selected in accordance with a second target digital content selection policy; and
   compare the performance value associated with the target digital content selection policy with the second performance value associated with the second target digital content selection policy.

6. The non-transitory computer readable medium of claim 5, wherein the instructions further cause the computer system to select the target digital content selection policy for execution by comparing the performance value associated with the target digital content selection policy with the second performance value associated with the second target digital content selection policy.

7. The non-transitory computer readable medium of claim 6, wherein the instructions cause the computer system to execute the target digital content selection policy by:
   selecting a digital content item list utilizing the target digital content selection policy; and
   providing the digital content item list for display to a client device.

8. The non-transitory computer readable medium of claim 6, wherein executing the target digital content selection policy comprises conducting an online A/B hypothesis test between the target digital content selection policy and another digital content selection policy.

9. The non-transitory computer readable medium of claim 5, wherein determining the item-level importance weight comprises:
- determining a first training item-level selection probability for the first digital content item based on the training digital content selection policy and a first target item-level selection probability for the first digital content item based on the target digital content selection policy; and
- determining the item-level importance weight based on the first training item-level selection probability and the first target item-level selection probability.

10. The non-transitory computer readable medium of claim 5, wherein training item lists generated in accordance the training digital content selection policy differ from target item lists generated in accordance with the target digital content selection policy.

11. The non-transitory computer readable medium of claim 5, wherein training the item-level importance sampling model further comprises:
- for a second digital content item of the digital content items, determining an additional item-level importance weight based on the training digital content selection policy and the target digital content selection policy; and
- applying the additional item-level importance weight to a second interaction from the identified digital interactions with a second digital content item from the digital content items.

12. The non-transitory computer readable medium of claim 11, wherein training the item-level importance sampling model further comprises:
- comparing the additional item-level importance weight to a clipping threshold; and
- based on the comparison between the additional item-level importance weight and the clipping threshold, applying the clipping threshold to the second interaction with the second digital content item to further train the item-level importance sampling model.

13. The non-transitory computer readable medium of claim 5, wherein training the item-level importance sampling model comprises training an item-position importance sampling model that generates the performance value based on both a position of the first digital content item within the first item list and content of the first digital content item.

14. The non-transitory computer readable medium of claim 5, wherein training the item-level importance sampling model comprises training a content-based importance sampling model that generates the performance value based on content of the first digital content item and independent of position of the first digital content item within the first item list.

15. A system comprising:
- at least one processor;
- a non-transitory computer readable medium comprising instructions that, when executed by the at least one processor, cause the system to:
  - identify digital interactions by users with respect to digital content items, the digital content items selected and presented as part of training item lists to computing devices of the users in accordance with a training digital content selection policy;
  - train an item-level importance sampling model to generate a performance value that indicates a probability that a user will interact with one or more items from a target item list selected in accordance with a target digital content selection policy by:
    - for a first digital content item of the digital content items, determining an item-level importance weight based on the training digital content selection policy and the target digital content selection policy; and
    - applying the item-level importance weight to a first interaction from the digital interactions by a first computing device of a first user with the first digital content item from a first item list train the item-level importance sampling model;
  - train the item-level importance sampling model to predict a second performance value indicating a second probability that a user will interact with one or more items from a second target item list selected in accordance with a second target digital content selection policy; and
  - compare the performance value associated with the target digital content selection policy with the second performance value associated with the second target digital content selection policy.

16. The system of claim 15, wherein the instructions cause the system to:
- select the target digital content selection policy for execution by comparing the performance value associated with the target digital content selection policy with the second performance value associated with the second target digital content selection policy.

17. The system of claim 15, further comprising instructions that, when executed by the at least one processor, cause the system to train the item-level importance sampling model by training an item-position importance sampling model that generates a performance value indicating a probability of interaction with the first digital content item based on both a position of the first digital content item within the first item list and content of the first digital content item.

18. The system of claim 15, further comprising instructions that, when executed by the at least one processor, cause the system to train the item-level importance sampling model by training a content-based importance sampling model that generates a performance value indicating a probability of interaction with the first digital content item based on content of the first digital content item and independent of position of the first digital content item within the first item list.

19. The system of claim 15, wherein the instructions cause the system to estimate the training digital content selection policy based on the training item lists presented to computing devices of training users.

20. The system of claim 15,
- wherein the training digital content selection policy comprises a distribution of training item lists in accordance with a plurality of contexts; and
- wherein the instructions further cause the system to train the item-level importance sampling model to predict a probability that a particular user will interact with a set of items from a target digital content item list selected in accordance with the target digital content selection policy based on a context associated with the particular user.

* * * * *